US008036233B2

(12) United States Patent
Yokomitsu et al.

(10) Patent No.: US 8,036,233 B2
(45) Date of Patent: Oct. 11, 2011

(54) POWER LINE COMMUNICATION APPARATUS, POWER LINE COMMUNICATION SYSTEM, POWER LINE COMMUNICATION METHOD AND INTEGRATED CIRCUIT

(75) Inventors: Yasushi Yokomitsu, Fukuoka (JP); Akio Yao, Fukuoka (JP); Yuji Igata, Fukuoka (JP); Noriaki Maehara, Fukuoka (JP)

(73) Assignee: Panasonic Corporation, Osaka (JP)

( * ) Notice: Subject to any disclaimer, the term of this patent is extended or adjusted under 35 U.S.C. 154(b) by 907 days.

(21) Appl. No.: 11/855,713

(22) Filed: Sep. 14, 2007

(65) Prior Publication Data

US 2008/0068141 A1    Mar. 20, 2008

(30) Foreign Application Priority Data

Sep. 15, 2006   (JP) .............................. P. 2006-250905

(51) Int. Cl.
*H04L 12/28* (2006.01)
(52) U.S. Cl. ...................... 370/401; 455/402; 340/12.38
(58) Field of Classification Search .................. 370/252, 370/349, 466, 401, 351; 455/205, 402; 409/238
See application file for complete search history.

(56) References Cited

U.S. PATENT DOCUMENTS

| | | | |
|---|---|---|---|
| 5,912,633 A | 6/1999 | Allison | |
| 6,985,714 B2* | 1/2006 | Akiyama et al. | 455/402 |
| 6,999,824 B2* | 2/2006 | Glanzer et al. | 700/18 |
| 7,320,078 B2* | 1/2008 | Balestriere | 713/300 |
| 7,406,536 B2* | 7/2008 | Efrati et al. | 709/238 |
| 7,627,304 B2* | 12/2009 | Koga et al. | 455/402 |
| 7,675,897 B2* | 3/2010 | Corcoran | 370/349 |
| 7,729,375 B2* | 6/2010 | Miyazaki et al. | 370/466 |
| 7,756,233 B2* | 7/2010 | Inoue et al. | 375/356 |
| 2005/0037722 A1* | 2/2005 | Koga et al. | 455/205 |
| 2006/0165054 A1* | 7/2006 | Iwamura | 370/351 |
| 2007/0091925 A1* | 4/2007 | Miyazaki et al. | 370/469 |
| 2010/0111153 A1* | 5/2010 | Koga et al. | 375/225 |

FOREIGN PATENT DOCUMENTS

| | | |
|---|---|---|
| DE | 100 26 930 | 12/2001 |
| EP | 1 424 787 | 6/2004 |
| JP | 07245576 | 9/1995 |

(Continued)

OTHER PUBLICATIONS

International Search Report dated Oct. 31, 2007.

*Primary Examiner* — Hassan Kizou
*Assistant Examiner* — Emmanuel Maglo
(74) *Attorney, Agent, or Firm* — Dickinson Wright PLLC

(57) ABSTRACT

A power line communication apparatus transmits a signal to a first power line communication apparatus through a power line connecting to a second power line communication apparatus. The power line communication apparatus includes an information retriever for retrieving transmission rate information indicating both a first transmission rate and second transmission rate. The first transmission rate correspond to a first path of the power line along which the signal is directly transmitted to the first power line communication apparatus, and the second transmission rate corresponds to a second path of the power line along which the signal is transmitted through the second power line communication apparatus to the first power line communication apparatus. A selector selects, based on the transmission rate information, a path corresponding to a higher transmission rate among the first and second paths. A transmitter transmits the signal through the selected path.

14 Claims, 19 Drawing Sheets

FOREIGN PATENT DOCUMENTS

| | | |
|---|---|---|
| JP | 10-507852 | 7/1998 |
| JP | 2004-186736 | 7/2004 |
| JP | 2006-074154 | 3/2006 |
| JP | 2006-135593 | 5/2006 |
| WO | 2005/122424 | 12/2005 |
| WO | 2006/047185 | 5/2006 |

* cited by examiner

FIG. 8

| PLC NUMBER | MAC ADDRESS | CONNECTION STATUS | TYPE |
|---|---|---|---|
| 0 | 00:80:F0:5F:00:00 | LINKED | MASTER |
| 1 | 00:80:F0:5F:00:01 | LINKED | SLAVE |
| 2 | 00:80:F0:5F:00:02 | LINKED | SLAVE |
| 3 | 00:80:F0:5F:00:03 | LINKED | SLAVE |
| 4 | 00:80:F0:5F:00:04 | NOT LINKED | SLAVE |
| 5 | 00:80:F0:5F:00:05 | LINKED | SLAVE |
| : | : | : | : |
| 127 | 00:80:F0:5F:00:7F | LINKED | SLAVE |

| DESTINATION PLC NUMBER | DESTINATION MAC ADDRESS | CONNECTION STATUS | PHY TRANSMISSION RATE |
|---|---|---|---|
| 0 | 00:80:F0:5F:00:00 | LINKED | 46Mbps |
| 1 | 00:80:F0:5F:00:01 | ITSELF | −1 (NOT CALCULATED) |
| 2 | 00:80:F0:5F:00:02 | LINKED | 120Mbps |
| 3 | 00:80:F0:5F:00:03 | LINKED | 76Mbps |
| 4 | 00:80:F0:5F:00:04 | NOT LINKED | −1 (NOT CALCULATED) |
| 5 | 00:80:F0:5F:00:05 | LINKED | 100Mbps |
| : | : | : | |
| 127 | 00:80:F0:5F:00:7F | LINKED | 65Mbps |

FIG. 10

| MAC ADDRESS | PLC NUMBER | TABLE NUMBER |
|---|---|---|
| 00:80:F0:5F:00:00 | 0 | 0 |
| 00:80:F0:5F:00:01 | 1 | 1 |
| 00:80:F0:5F:00:02 | 2 | 2 |
| 00:80:F0:5F:00:03 | 3 | 3 |
| 00:80:F0:5F:00:04 | 4 | 4 |
| 00:80:F0:5F:00:05 | 5 | 5 |
| ⋮ | ⋮ | ⋮ |
| 00:80:F0:5F:00:7F | 127 | 127 |

| DESTINATION PLC NUMBER | DESTINATION MAC ADDRESS | CONNECTION STATUS | PHY TRANSMISSION RATE |
|---|---|---|---|
| 0 | 00:80:F0:5F:00:00 | ITSELF | -1 (NOT CALCULATED) |
| 1 | 00:80:F0:5F:00:01 | LINKED | 50Mbps |
| 2 | 00:80:F0:5F:00:02 | LINKED | 55Mbps |
| 3 | 00:80:F0:5F:00:03 | LINKED | 135Mbps |
| 4 | 00:80:F0:5F:00:04 | NOT LINKED | -1 (NOT CALCULATED) |
| 5 | 00:80:F0:5F:00:05 | LINKED | 80Mbps |
| : | : | : | : |
| 127 | 00:80:F0:5F:00:7F | LINKED | 145Mbps |

| DESTINATION PLC NUMBER | DESTINATION MAC ADDRESS | CONNECTION STATUS | PHY TRANSMISSION RATE |
|---|---|---|---|
| 0 | 00:80:F0:5F:00:00 | LINKED | 46Mbps |
| 1 | 00:80:F0:5F:00:01 | ITSELF | -1 (NOT CALCULATED) |
| 2 | 00:80:F0:5F:00:02 | LINKED | 120Mbps |
| 3 | 00:80:F0:5F:00:03 | LINKED | 76Mbps |
| 4 | 00:80:F0:5F:00:04 | NOT LINKED | -1 (NOT CALCULATED) |
| 5 | 00:80:F0:5F:00:05 | LINKED | 100Mbps |
| : | : | : | |
| 127 | 00:80:F0:5F:00:7F | LINKED | 65Mbps |

| DESTINATION PLC NUMBER | DESTINATION MAC ADDRESS | CONNECTION STATUS | PHY TRANSMISSION RATE |
|---|---|---|---|
| 0 | 00:80:F0:5F:00:00 | LINKED | 53Mbps |
| 1 | 00:80:F0:5F:00:01 | LINKED | 123Mbps |
| 2 | 00:80:F0:5F:00:02 | ITSELF | -1 (NOT CALCULATED) |
| 3 | 00:80:F0:5F:00:03 | LINKED | 100Mbps |
| 4 | 00:80:F0:5F:00:04 | NOT LINKED | -1 (NOT CALCULATED) |
| 5 | 00:80:F0:5F:00:05 | LINKED | 146Mbps |
| : | : | : | : |
| 127 | 00:80:F0:5F:00:7F | LINKED | 98Mbps |

| DESTINATION PLC NUMBER | DESTINATION PLC NUMBER | DESTINATION MAC ADDRESS | CONNECTION STATUS | PHY TRANSMISSION RATE |
|---|---|---|---|---|
| 0 | 0 | 00:80:F0:5F:00:00 | ITSELF | -1 (NOT CALCULATED) |
| 0 | 1 | 00:80:F0:5F:00:01 | LINKED | 50Mbps |
| 0 | 2 | 00:80:F0:5F:00:02 | LINKED | 55Mbps |
| 0 | 3 | 00:80:F0:5F:00:03 | LINKED | 135Mbps |
| 0 | 4 | 00:80:F0:5F:00:04 | NOT LINKED | -1 (NOT CALCULATED) |
| 0 | 5 | 00:80:F0:5F:00:05 | LINKED | 80Mbps |
| : | : | : | : | : |
| 0 | 127 | 00:80:F0:5F:00:7F | LINKED | 145Mbps |
| 1 | 0 | 00:80:F0:5F:00:00 | LINKED | 46Mbps |
| 1 | 1 | 00:80:F0:5F:00:01 | ITSELF | -1 (NOT CALCULATED) |
| 1 | 2 | 00:80:F0:5F:00:02 | LINKED | 120Mbps |
| 1 | 3 | 00:80:F0:5F:00:03 | LINKED | 76Mbps |
| 1 | 4 | 00:80:F0:5F:00:04 | NOT LINKED | -1 (NOT CALCULATED) |
| 1 | 5 | 00:80:F0:5F:00:05 | LINKED | 100Mbps |
| : | : | : | : | : |
| 1 | 127 | 00:80:F0:5F:00:7F | LINKED | 65Mbps |
| 2 | 0 | 00:80:F0:5F:00:00 | LINKED | 53Mbps |
| 2 | 1 | 00:80:F0:5F:00:01 | LINKED | 123Mbps |
| 2 | 2 | 00:80:F0:5F:00:02 | ITSELF | -1 (NOT CALCULATED) |
| 2 | 3 | 00:80:F0:5F:00:03 | LINKED | 100Mbps |
| 2 | 4 | 00:80:F0:5F:00:04 | NOT LINKED | -1 (NOT CALCULATED) |
| 2 | 5 | 00:80:F0:5F:00:05 | LINKED | 146Mbps |
| : | : | : | : | : |
| 2 | 127 | 00:80:F0:5F:00:7F | LINKED | 98Mbps |
| 3 | 0 | 00:80:F0:5F:00:00 | LINKED | 132Mbps |
| 3 | 1 | 00:80:F0:5F:00:01 | LINKED | 74Mbps |
| 3 | 2 | 00:80:F0:5F:00:02 | LINKED | 103Mbps |
| 3 | 3 | 00:80:F0:5F:00:03 | ITSELF | -1 (NOT CALCULATED) |
| 3 | 4 | 00:80:F0:5F:00:04 | NOT LINKED | -1 (NOT CALCULATED) |
| 3 | 5 | 00:80:F0:5F:00:05 | LINKED | 70Mbps |
| : | : | : | : | : |
| 3 | 127 | 00:80:F0:5F:00:7F | LINKED | 152Mbps |
| 127 | 0 | 00:80:F0:5F:00:00 | LINKED | 148Mbps |
| 127 | 1 | 00:80:F0:5F:00:01 | LINKED | 68Mbps |
| 127 | 2 | 00:80:F0:5F:00:02 | LINKED | 100Mbps |
| 127 | 3 | 00:80:F0:5F:00:03 | LINKED | 155Mbps |
| 127 | 4 | 00:80:F0:5F:00:04 | NOT LINKED | -1 (NOT CALCULATED) |
| 127 | 5 | 00:80:F0:5F:00:05 | LINKED | 80Mbps |
| : | : | : | : | : |
| 127 | 127 | 00:80:F0:5F:00:7F | ITSELF | -1 (NOT CALCULATED) |

| PATH | ATTENUATION [dB] | THROUGHPUT |
|---|---|---|
| A−B | LONG DISTANCE AND SAME PHASE ATTENUATION −10dB | 50Mbps |
| B−C | SHORT DISTANCE AND DIFFERENT PHASE ATTENUATION −20dB | 30Mbps |
| A−C | LONG DISTANCE AND DIFFERENT PHASE ATTENUATION −32dB | 10Mbps |

POWER LINE COMMUNICATION APPARATUS, POWER LINE COMMUNICATION SYSTEM, POWER LINE COMMUNICATION METHOD AND INTEGRATED CIRCUIT

FIELD OF THE INVENTION

The present invention relates to a power line communication apparatus performing power line communication, a power line communication system utilizing the power line communication apparatus, a power line communication method performing power line communication and an integrated circuit performing power line communication.

BACKGROUND OF THE RELATED ART

Power Line Communication (PLC), also known as Broadband over Power Lines (BPL), relates to communication over power lines that supply commercial power. Japanese Patent Laid-Open Publication 1995-245576 discloses that PLC usually utilizes a parallel cable of a pair of wires. In a home network utilizing power line communication, a pair of communication apparatuses perform communication between a pair of modems. Each of the communication apparatuses connects to an electrical outlet through the modem and the parallel cable.

In a single-phase three-wire system of a home, a 100VAC power system and a 200VAC power system are different in respect of a method for connecting to power lines. Specifically, a 100VAC electric appliance connects to a set of a neutral line and a voltage line. A 200VAC electric appliance connects to a pair of voltage lines. In some cases, the 200VAC electric appliance further connects to a neutral line as a ground line.

Hereinafter, a pair of voltage lines may be referred to as "a first voltage line" and "a second voltage line". The 100VAC electric appliance connects to both the neutral line and each of the first voltage line and the second voltage line. Accordingly, the 100VAC power system has both the 100VAC electric appliance connecting the first voltage line and the 100VAC electric appliance connecting the second voltage line.

Referring to FIG. 21A, the illustrated power line communication system has three power line communication modems A, B, and C. The power line communication system performs power line communication between power line communication modems.

PLC modems A and B connect to both second voltage line P2 and neutral line P0, directly or through a 100VAC outlet (not shown in the drawing). PLC modem C connects to both first voltage line P1 and second voltage line P2, directly or through a 200VAC outlet (not shown in the drawing).

When the power line system performs power line communication utilizing the single-phase three-wire system, the method for connecting to the power line (outlet) can affect communication quality. Specifically, in a case in which PLC modems A and C perform power line communication, neutral line P0 of PLC modem A and first voltage line P1 of PLC modem C are not electrically connected as shown in FIG. 21A. Consequently, a signal travels through inductance and capacitance generated between neutral line P0 and first voltage line P1. As a result, the inductance and capacitance can attenuate the signal.

FIG. 21B shows an example of throughput (effective transmission rate) of transmission performed by PLC modems A, B, and C. A distance between PLC modems A and B is long. However, the phase of PLC modems A and B is the same; that is, PLC modem A electrically connects to PLC modem B with both neutral line P0 and first voltage line P1. Therefore, since attenuation is low, e.g., −10 dB, throughput is 50 Mbps.

On the other hand, a distance between PLC modems B and C is short. However, the phase of PLC modems B and C is different; that is, neutral line P0 does not electrically connect to first voltage line P1. Therefore, since attenuation is high, e.g., −20 dB, throughput is 30 Mbps.

Also, a distance between PLC modems C and A is long, and the phase of PLC modems C and A is different. Therefore, since attenuation is higher, e.g., −32 dB, throughput is 10 Mbps.

In the above-mentioned related art of FIG. 21B, throughput of both upstream and downstream is the same. However, throughput can be made different by an internal or external condition of the PLC modems. Influence caused by a noise source (e.g., an electric light, a dryer, and a vacuum cleaner) depends on both a position of an electrical outlet to which PLC modem connects and a path through which PLC modems perform the communication. Therefore, the position and the path can considerably change throughput.

As described above, in a case m which communication is performed utilizing power lines, the power line communication system is required to take into account conditions where the position and the path can change throughput. Japanese Patent Laid-Open Publication 2005-3332233 discloses a technical method for improving transmission status when the power line communication is performed utilizing the single-phase three-wire system.

SUMMARY

To address the above-described problems, an object is to provide a power line communication apparatus, a power line communication system utilizing the power line communication apparatus, a power line communication method, and an integrated circuit performing power line communication, which are capable of efficiently performing power line communication regardless of a connection status to power lines.

One or more objects may be achieved by a power line communication apparatus that transmits a signal to a first power line communication apparatus through a power line connecting to a second power line communication apparatus. The power line communication apparatus includes an information retriever for retrieving transmission rate information indicating both a first transmission rate and second transmission rate. The first transmission rate corresponds to a first path of the power line along which the signal is directly transmitted to the first power line communication apparatus, and the second transmission rate corresponds to a second path of the power line along which the signal is transmitted through the second power line communication apparatus to the first power line communication apparatus. A selector selects, based on the transmission rate information, a path corresponding to a higher transmission rate among the first and second paths. A transmitter transmits the signal through the selected path.

One or more objects may be also achieved by a power line communication system that performs power line communication through a power line. The power line communication system includes first, second, and third power line communication apparatuses. The third power line communication apparatus transmits a signal to the first power line communication apparatus through the power line that connects to the second power line communication apparatus. The third power line communication apparatus includes an information retriever for retrieving transmission rate information indicating both a first transmission rate and a second transmission rate. The first transmission rate corresponds to a first path of the power line along which the signal is directly transmitted to the first power line communication apparatus, and the second transmission rate corresponds to a second path of the power line along which the signal is transmitted through the second power line communication apparatus to the first power line communication apparatus. A selector selects, based on the transmission rate information retrieved by the information retriever, a path corresponding to a higher transmission rate among the first path and the second path. A transmitter transmits the signal, through the path selected by the selector, to the first power line communication apparatus.

One or more objects may be further achieved by a power line communication method for transmitting a signal to a first power line communication apparatus through a power line connecting to a second power line communication apparatus. The power line communication method includes retrieving transmission rate information indicating both a first transmission rate and a second transmission rate. The first transmission rate corresponds to a first path of the power line along which the signal is directly transmitted to the first power line communication apparatus, and the second transmission rate corresponds to a second path of the power line along which the signal is transmitted through the second power line communication apparatus to the first power line communication apparatus. A path corresponding to a higher transmission rate among the first path and the second path is selected based on the retrieved transmission rate information. The signal is transmitted through the selected path to the first power line communication apparatus.

One or more objects may be further achieved by an integrated circuit for performing power line communication of a signal to a first power line communication apparatus through a power line connecting to a second power line communication apparatus. The integrated circuit includes an information retriever that retrieves transmission rate information indicating both a first transmission rate and a second transmission rate. The first transmission rate corresponds to a first path of the power line along which the signal is directly transmitted to the first power line communication apparatus, and the second transmission rate corresponds to a second path of the power line along which the signal is transmitted through the second power line communication apparatus to the first power line communication apparatus. A selector selects, based on the transmission rate information retrieved by the information retriever, a path corresponding to a higher transmission rate among the first path and the second path.

BRIEF DESCRIPTION OF THE DRAWINGS

FIG. 8 illustrates an apparatus list used by the power line communication system according to the first embodiment;

FIG. 9 illustrates the results of transmission rate measured by the PLC modem according to the first embodiment.

FIG. 10 illustrates status information used by the power line communication system according to the first embodiment.

FIG. 11A illustrates status information of table number: 0 used by the power line communication system according to the first embodiment.

FIG. 11B illustrates status information of table number: 1 used by the power line communication system according to the first embodiment.

FIG. 11C illustrates status information of table number: 2 used by the power line communication system according to the first embodiment.

FIG. 12 illustrates another example of the status information used by the power line communication system according to the first embodiment.

DETAILED DESCRIPTION

First Embodiment

Figure 1A:
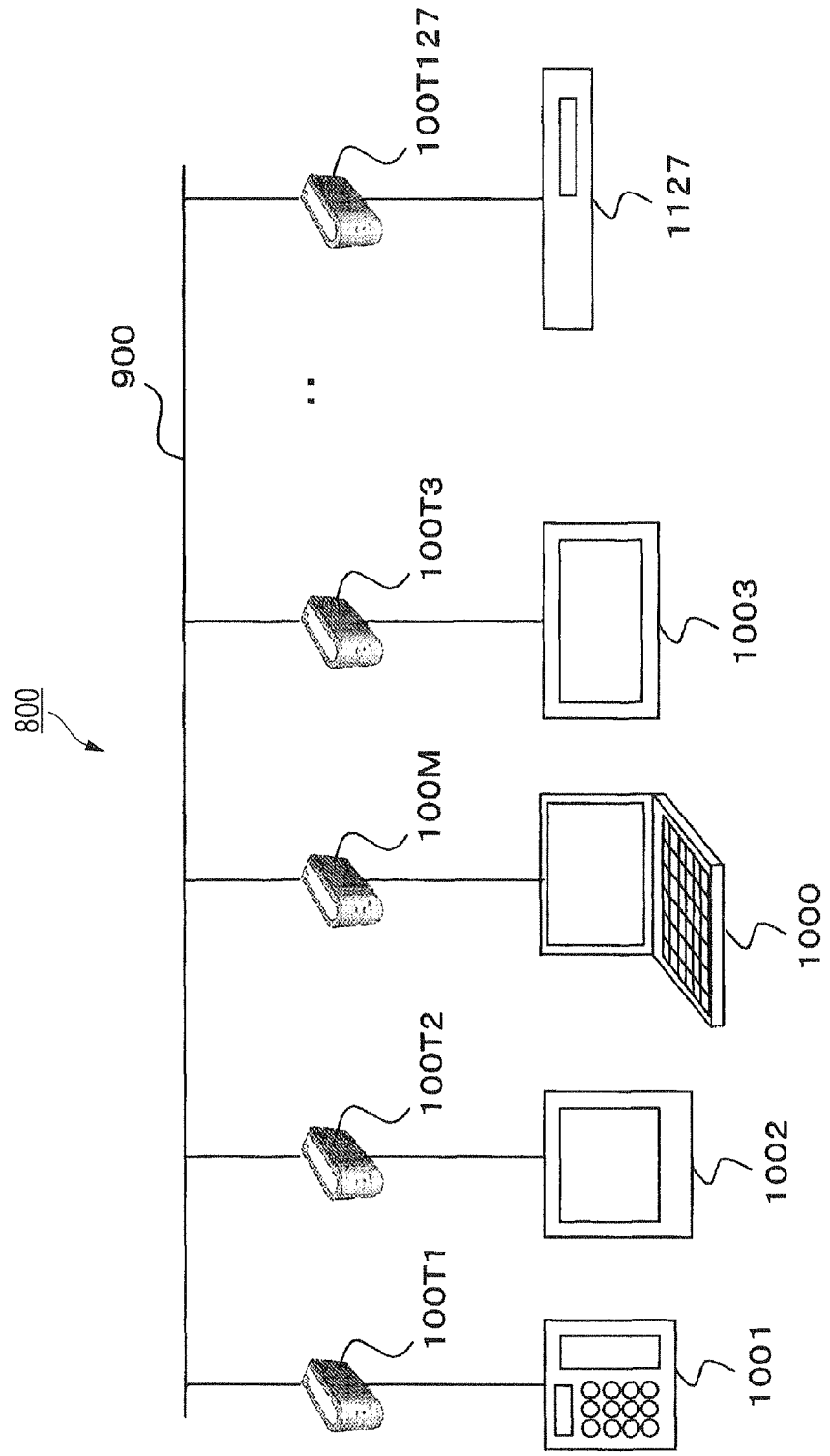
FIG. 1A illustrates a configuration of a power line communication system according to a first and a second embodiment.

Referring to FIG. 1A, a power line communication system 800 has a plurality of power line communication modems (PLC modems) 100M, 100T1, 100T2, 100T3, y, and 100T127 connecting to a power line 900. PLC system 800 forms a PLC network in which PLC modems perform communication through power line 900 in a frequency band of 1.705-80 MHz. The frequency band is arbitrary, and, for example, 1.705-30 MHz or 2 to 30 MHZ may be used instead. Power line 900 supplies an alternating voltage: 120VAC/60

Hz. However, both the voltage and the frequency are arbitrary. For example, 100VAC or 220VAC may used and 50 Hz may be used.

In a first embodiment, a 128 PLC modems, for example, may be connected to power line 900. FIG. 1A shows five and more PLC modems connecting to power line 900. The number of PLC modems is arbitrary.

PLC modem 100M works as a master. PLC modems 100T1, 100T2, 100T3 Y, and 100T127 work as slaves. In the PLC network, the master manages the communication between slaves. Specifically, PLC modem 100M controls connection status between a pair of PLC modems.

PLC modems 100M, 100T1, 100T2, 10T3, Y, and 100T127 each connect to an electric appliance respectively. Specifically, PLC modem 100M connects to a personal computer 1000. PLC modem 100T1 connects to a telephone 1001. PLC modem 100T2 connects to a television 1002. PLC modem 100T3 connects to a television 1003. PLC modem 100T127 connects to a video cassette recorder or DVD player 1127.

"Connection status" constitutes information indicating whether or not a PLC modem joins the PLC network and is capable of performing communication within a local area network (LAN). Specifically, it is required for a PLC modem at least to electrically connect to a power line and obtain an address of another PLC modem in order to join the PLC network.

PLC modems 100T1, 100T2, 100T3 Y, and 100T127 shown in FIG. 1A are illustrated as an example of the power line communication apparatus, and an electric appliance with a built-in PLC modem may be used instead. The electric appliance may include home electric appliances, such as a television, a telephone, a video cassette recorder, a DVD player and a set top box and office machinery such as a personal computer, a facsimile, and a printer.

For describing both the master and a specific slave, the master may be referred to as "PLC modem loom" or "master modem" and the slave may be referred to as "100T1, 100T2, 100T3, . . . , and 100T127". When describing an arbitrary slave, the slave may be referred to as "PLC modem 100T" or "slave modem". If the master and the slave need not be distinguished, each of the master and the slave may be referred to as "PLC modem 100" or "PLC modem".

Figure 1B:
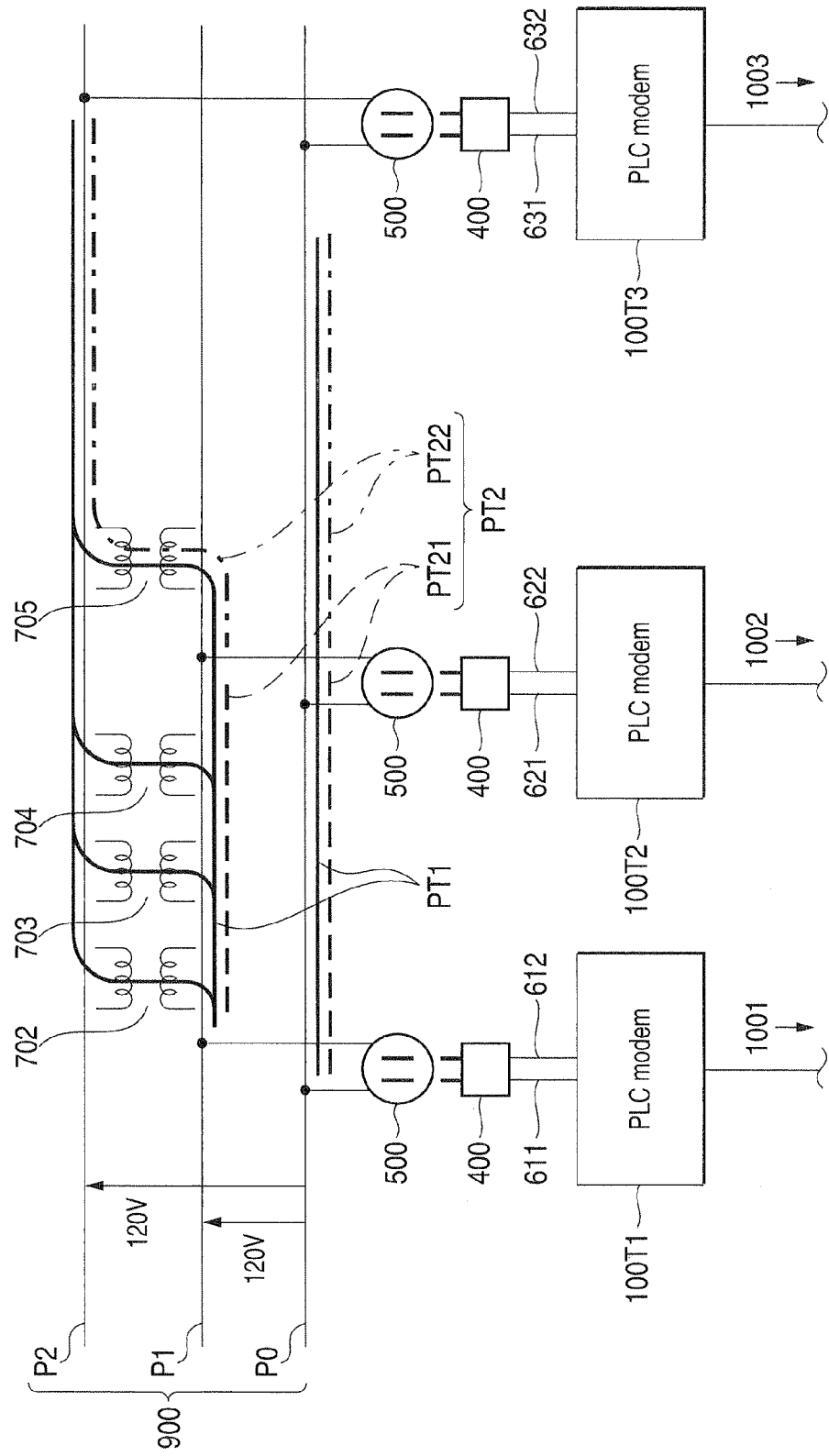
FIG. 1B is a pattern diagram illustrating paths between PLC modems of FIG. 1A.

Referring to FIG. 1B, power line 900 has a plurality of wires. The plurality of wires include neutral line P0, first voltage line P1, and second voltage line P2. Neutral line P0 works as a ground line. First and second voltage lines P1 and P2 supply 120VAC respectively. PLC modem 100 connects to both neutral line P0 and each of first and second voltage line P1 and P2. Consequently, PLC modem 100 receives 120VAC from power line 900. FIG. 1B will be described in detail, hereinafter.

Figure 2:
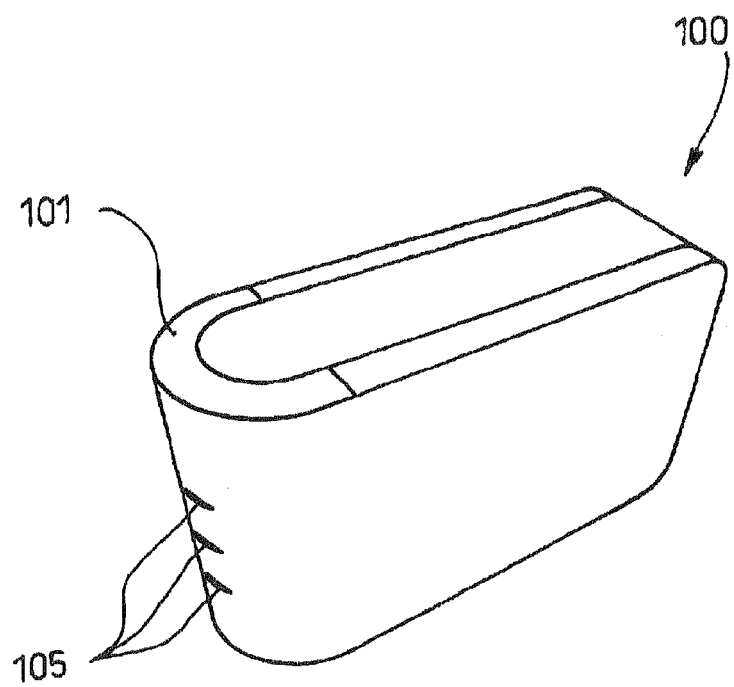
FIG. 2 is an external perspective view illustrating a front side of a PLC modem according to the first and the second embodiment.
Figure 3:
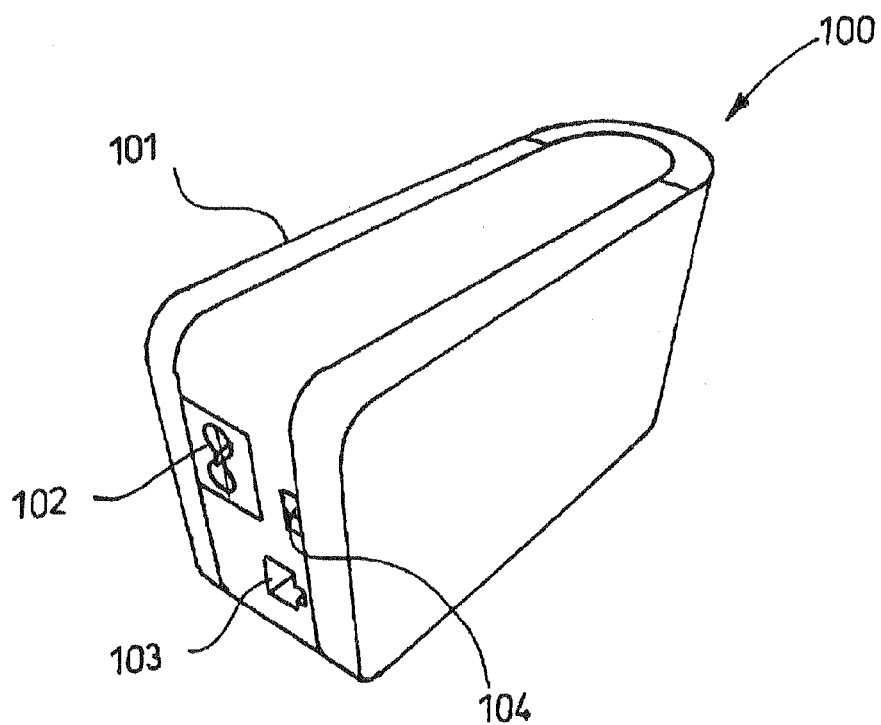
FIG. 3 is an external perspective view illustrating a rear side of the PLC modem according to the first and the second embodiment.

Referring to FIG. 2 and FIG. 3, PLC modem 100 has a case 101. A plurality of displays 105 such as Light Emitting Diodes (LEDs) are provided on a front side of case 101. A power connector 102, a LAN modular jack 103, such as an RJ-45, and a switch 104 for switching operation mode are provided on a rear side of case 101. Power connector 102 connects to a power cable (not shown in the drawing). LAN modular jack 103 connects to a LAN cable (not shown in the drawing). PLC modem 100 may have a D-sub connector (D-subminiature) operable to connect to a D-sub cable (not shown in the drawing).

Figure 4:
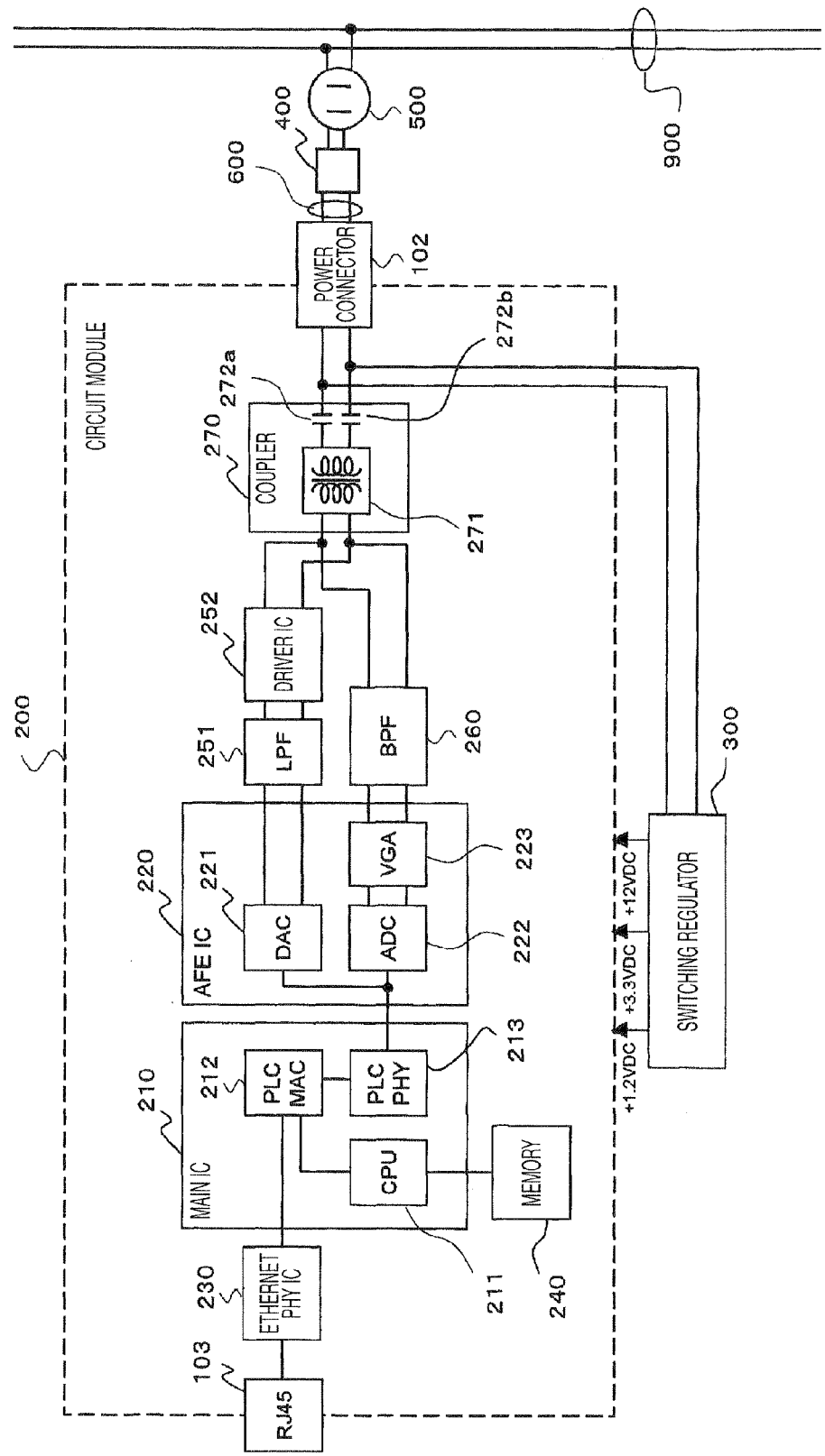
FIG. 4 is a block diagram illustrating hardware in the PLC modem according to the first and the second embodiment.

Referring to FIG. 4, PLC modem 100 includes a circuit module 200 and a switching regulator 300. Switching regulator 300 supplies voltages of various levels (e.g., DC +1.2V, +3.3V, +12V) to circuit module 200 from a power line 900. Circuit module 200 may include a switching transformer and a DC-DC converter (not shown in the drawing), for example.

Circuit module 200 includes a main Integrated Circuit (IC) 210, an Analog Front End Integrated Circuit (AFE IC) 220, an ethernet Physical layer Integrated Circuit (PHY IC) 230, a memory 240, a Low Pass Filter (LPF) 251, a driver IC 252, a Band Pass Filter (BPF) 260, and a coupler 270. Switching regulator 300 and coupler capacitor 270 connect to power connector 102. Switching regulator 300 and coupler 270 further connect to power line 900 through a power cable 600, a power plug 400, and an outlet 500. Main IC 210 is an example of a circuit controlling power line communication.

Main IC 210 includes a Central Processing Unit (CPU) 211, a Power Line Communication/Media Access Control layer block (PLC MAC block) 212, and a Power Line Communication/Physical layer block (PLC PHY block) 213. CPU 211 is equipped with an Application Specific Integrated Circuit (ASIC), such as a 32-bit Reduced Instruction Set Computer (RISC) processor. PLC MAC block 212 controls a MAC layer of both a transmission signal and a reception signal. PLC PHY block 213 controls a PHY layer of both a transmission signal and a reception signal. AFE IC 220 includes a Digital Analog Converter (DAC) 221, an Analog Digital Converter (ADC) 222, and a Variable Gain Amplifier (VGA) 223. Coupler 270 includes a coil transformer 271, a coupling capacitor 272$a$, and a coupling capacitor 272$b$. CPU 211 controls both PLC MAC block 212 and PLC PHY block 213 with various data stored in memory 240 and further provides overall control of PLC modem 100.

PLC modem performs power line communication as follows. When an electric appliance, such as personal computer 1000, inputs data into PLC modem 100 through LAN modular jack 103, ethernet PHY IC 230 receives the data. Ethernet PHY IC 230 transmits the data to main IC 210. Main IC 210 performs a digital process for generating a digital signal based on the data and transmits the digital signal to AFE IC 220. DAC 221 converts the digital signal into an analog signal. AFE IC 220 transmits the analog signal to power line 900 through LPF 251, driver IC 252, and coupler 270. Coupler 270 superimposes the analog signal on an alternating voltage, 120VAC. Coupler 270 transmits the analog signal to power line 900 through power connector 102, power cable 600, power plug 400, and outlet 500.

When PLC modem 100 receives a reception signal superimposed on the alternating voltage supplied from power line 900, coupler 270 extracts an analog signal from the alternating voltage. Coupler 270 transmits the analog signal to VGA 223 in AFE IC 220, through BPF 260. VGA 223 amplifies the analog signal with a predetermined gain. ADC 222 converts the amplified analog signal into a digital signal. Main IC performs a digital process for generating data based on the digital signal. PLC modem 100 outputs the data from LAN modular jack 103 through ethernet PHY IC 230.

Figure 5:
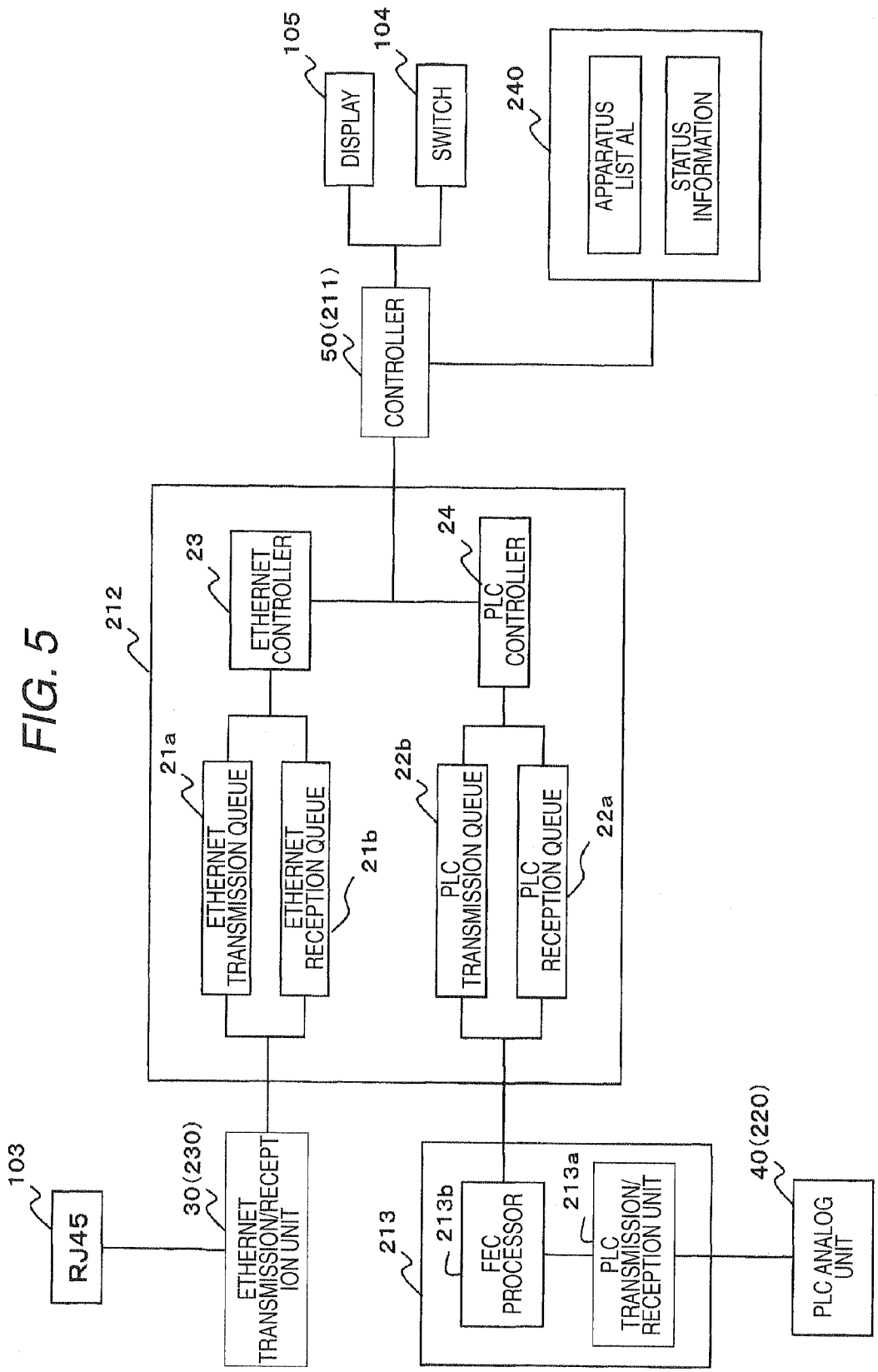
FIG. 5 is a detailed block diagram illustrating hardware in the PLC modem according to the first and the second embodiment.

An example of the digital signal process performed by main IC 210 is described as follows, with reference to FIG. 5 and FIG. 6. Referring to FIG. 5, PLC MAC block 212 has an ethernet transmission queue 21$a$, an ethernet reception queue 21$b$, a PLC transmission queue 22$a$, a PLC reception queue 22$b$, an ethernet controller 23, and a PLC controller 24. PLC PHY block 213 has a PLC transmission/reception unit 213$a$ and a Forward Error Correction (FEC) processor 213$b$.

Both ethernet transmission queue 21$a$ and ethernet reception queue 21$b$ connect to ethernet transmission/reception unit 30. Ethernet PHY IC 230 is an ethernet transmission/reception unit 30. In a transmitting process, ethernet transmission queue 21$a$ sequentially stores data and transmits, based on a First-In First-Out (FIFO) scheme, the stored data to a LAN cable (not shown in the drawing), such as an ethernet cable, through LAN modular jack 103. In a receiving process, ethernet reception queue 21b receives data through LAN modular jack 103 and ethernet transmission/reception unit 30 and sequentially stores the received data. Ethernet controller 23 performs both the transmitting process and the reception process.

Both PLC transmission queue 22a and PLC reception queue 22b connect to FEC processor 213b in PLC PHY block 213. PLC transmission queue 22a sequentially stores packet data, which is transmitted through power line 900. PLC PHY block 213 transmits the packet data to AFE IC 220. AFE IC 220 converts the packet data into an analog signal. AFE IC 220 works as a PLC analog unit 40. PLC reception queue 22b sequentially stores the packet data that is transmitted from PLC analog unit 40 through PLC PHY block 213 and processes the packet data based on information indicated by a header in the packet data. PLC controller 24 processes the packet data stored in both PLC transmission queue 22a and PLC reception queue 22b.

CPU 211 works as a controller 50. Controller 50 controls not only the whole PLC MAC block 212 but also both PLC PHY block 213 and PLC analog unit 40. Memory 240 stores various pieces of information used for the operation of PLC modem 100. The information includes a program executed by the CPU, an apparatus list (AL) and status information.

FEC processor 213b performs error correction regarding data of transmission and reception signals as follows. When FEC processor 213b receives transmission data from PLC transmission queue 22a, FEC processor 213b adds redundancy data for the error correction to the transmitted data. Then FEC processor 213b corrects an error of the received data using the redundancy data. PLC transmission/reception unit 213a converts digital data into an analog signal and converts an analog signal into digital data.

PLC modem 100 performs multi-carrier communication using a plurality of sub-carriers. The multi-carrier communication includes various modification schemes such as Orthogonal Frequency Division Multiplexing (OFDM). Accordingly, PLC transmission/reception unit 213a converts a digital data into an analog signal and converts an analog signal into digital data by the modification scheme.

PLC transmission/reception unit 213a performs OFDM using a discrete wavelet transform. Referring to FIG. 6, PLC transmission/reception unit 213a has functions of a transform controller 10, a symbol mapper 11, a serial-parallel converter (S/P converter) 12, an inverse-wavelet transformer 13, a wavelet transformer 14, a parallel-serial converter (P/S converter) 15, and a demapper 16.

Figure 6:
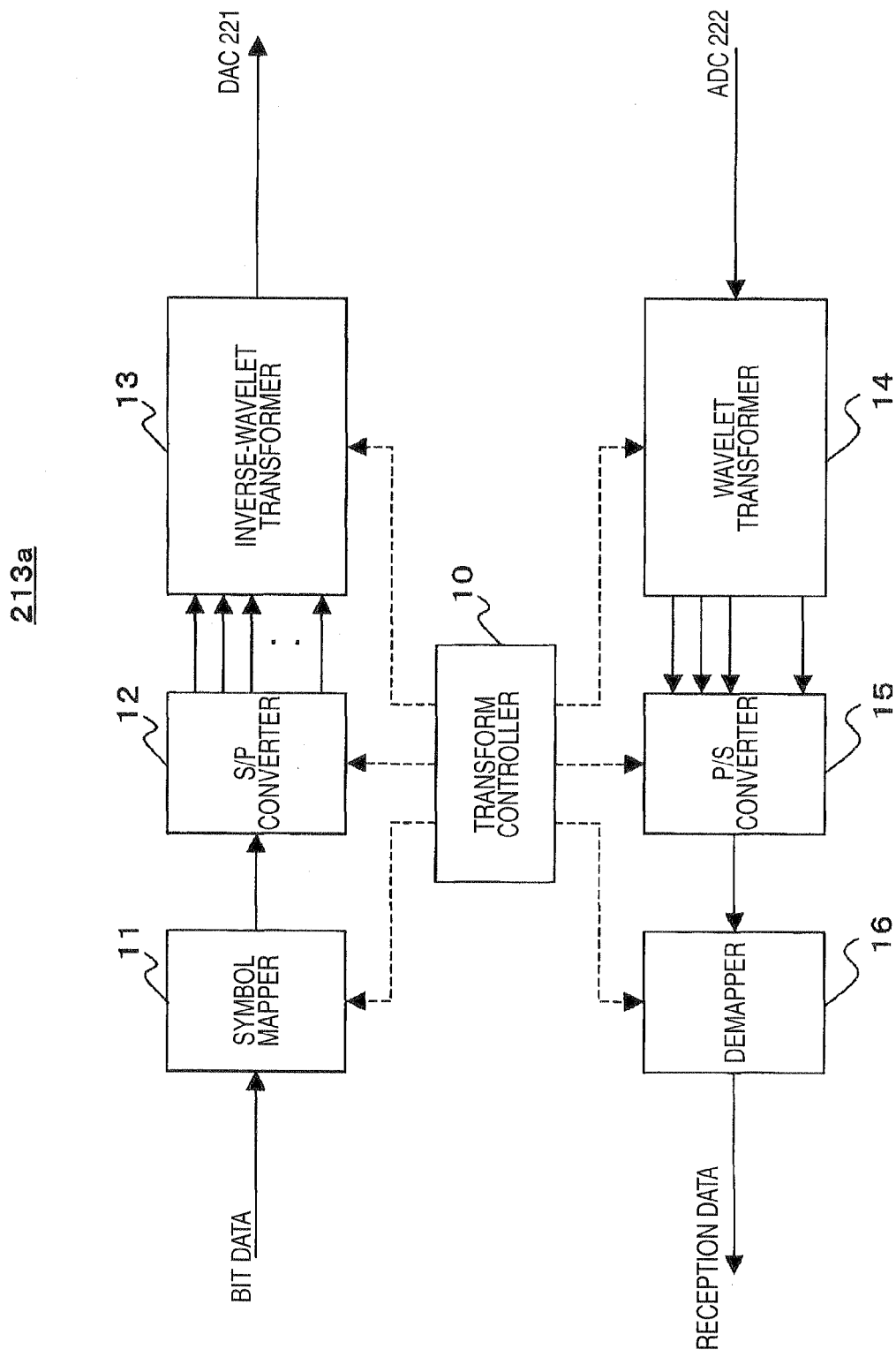
FIG. 6 is a functional block diagram of PLC PHY Block according to the first and the second embodiment.

Referring to FIG. 6, when symbol mapper 11 receives bit data from FEC processor 213b, symbol mapper 11 converts the bit data into symbol data. Then symbol mapper 11 performs symbol mapping (e.g., Pulse Amplitude Modification (PAM)) according to each of the symbol data and outputs the result as serial data to S/P converter 12. S/P converter 12 converts the serial data into parallel data and outputs the parallel data to inverse-wavelet transformer 13 as frequency-domain data. Inverse-wavelet transformer 13 performs an inverse-wavelet transform to transform the parallel data into time-domain data. Then, inverse-wavelet transformer 13 generates a sample sequence indicating a symbol for transmission and outputs the sample sequence to DAC 221.

ADC 222 converts a reception signal into digital data and outputs the digital data to wavelet transformer 14. Wavelet transformer 14 receives the digital data from ADC 222 as time-domain data. The digital data is the sample sequence sampled with a rate that is the same as the sample rate. Wavelet transformer 14 performs a discrete wavelet transform to transform the digital data into frequency-domain data and outputs the frequency data as parallel data. P/S converter 15 converts the parallel data into serial data and outputs the serial data. Demapper 16 calculates an amplitude value corresponding to each of a plurality of sub-carriers using the serial data. Demapper 16 detects reception data from the amplitude value. In other words, demapper 16 detects where a signal point is located on complex coordinates.

Figure 7:
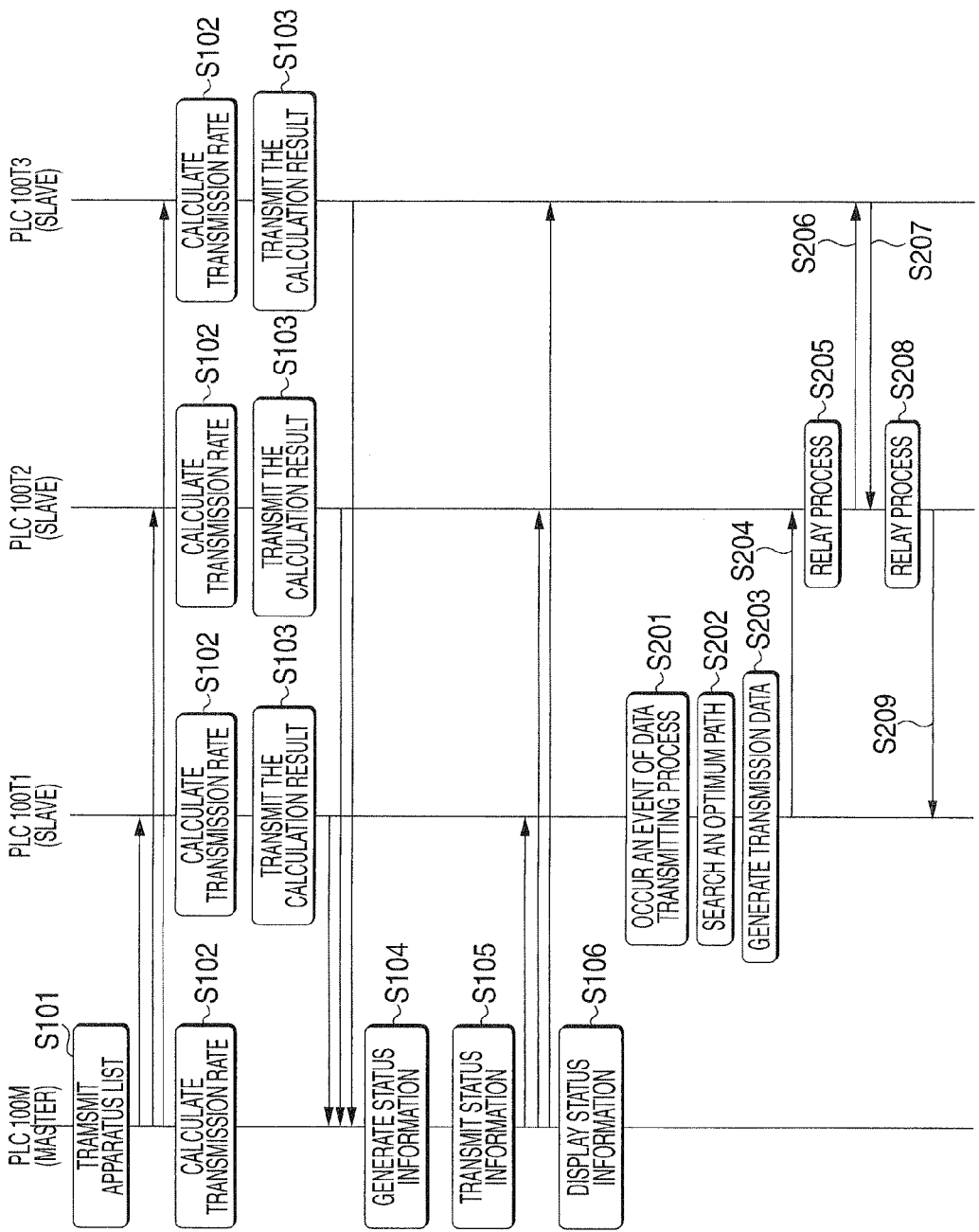
FIG. 7 illustrates a sequence of process performed by the power line communication system according to the first embodiment.

Referring to FIG. 7, the number of slave modems, which are PLC modems 100T1, 100T2, 100T3, is three; however, the number is not limited to three. More than three slave modems may connect to power line 900.

In step S101, PLC modem 100M transmits apparatus list AL to PLC modems 100T1, 100T2, and 100T3 through power line 900. PLC modems 100T1, 100T2, 100T3 receive apparatus list AL, respectively. Apparatus list AL indicates information regarding PLC modem 100 in the PLC network.

Referring to FIG. 8, an example of apparatus list AL indicates a media access control (MAC) address, a connection status, and a type corresponding to a PLC number. PLC modems 100M, 100T1, 100T2, Y, and 100T127 correspond to PLC numbers "0", "A1" "A2", . . . , and "127", respectively. The connection status is information indicating whether or not a PLC modem joins the PLC network. Accordingly, "linked" indicates a status where a PLC modem joins the PLC network and "not linked" indicates a status where a PLC modem does not join the PLC network. Type indicates a type of PLC modem, that is, master or slave.

When PLC modem 100M performs a negotiation with each of PLC modems 100T1, 100T2, 100T3, Y, and 100T127, PLC modem 100M renews apparatus list AL. In the present embodiment, PLC modem 100M transmits apparatus list AL at the renewal process; however, PLC modem 100M may transmit apparatus list AL at a time other than the renewal process. For example, PLC modem 100M may periodically transmit apparatus list AL and may transmit apparatus list AL during a calculation of the transmission rate.

PLC modem 100 performs the calculation process of the transmission rate (i.e., throughput). Specifically, each of PLC modems 100M, 100T1, 100T2, Y, and 100T127 calculates the transmission rate at an arbitrary time (step S102). The timing of the calculation process may be arbitrary. For example, the timing may be one when the master modem requests a slave modem to start the calculation process. Also, the timing may be one when an electric appliance requests a PLC modem to start the calculation process. As described above, the electric appliance equipments may include personal computer 1000, telephone 1001, television 1002 and 1003, Y, and video cassette recorder 1127.

In step S102, each of PLC modems 100 transmits a channel estimation frame to the other PLC modems so as to perform the calculation process. A channel estimation frame is a frame having a predetermined characteristic corresponding to a frequency of a sub-carrier. The predetermined characteristic includes phase and/or level corresponding to a sub-carrier, such as power or voltage. In a case of multi-carrier communication, the channel estimation frame has a plurality of sub-carriers.

In a case of the calculation process between PLC modem 100T1 and PLC modem 100M, PLC modem 100T1 transmits the channel estimation frame to PLC modem 100M. When PLC modem 100M receives the channel estimation frame, PLC modem 100M returns the channel estimation frame indicating the results of how the channel estimation frame would change regarding the phase and/or the level. That is to say, the results show the transmission rate based on a MAC layer (referred to as "MAC transmission rate") and/or a PHY layer (referred to as "PHY transmission rate"). The PLC modem may calculate the transmission rate using various parameters. For example, the parameters may include a transmission error rate, such as block error rate, and an error rate of Reed-Solomon. The transmission error rate is available from a frame, the payload of which includes data, such as image data, sound data, and text data.

The transmission rate is the PHY transmission rate, MAC transmission rate, PHY transmission rate modified in accordance with a fluctuation rate in a transmission line (referred to as a "PHY modified transmission rate"), or MAC transmission rate modified in accordance with an error rate (referred to as a "MAC modified transmission rate"). For example, the PHY transmission rate may be an average in a case of transmitting the channel estimation frame in two or more transmissions. Also, the fluctuation rate may be a standard deviation in a case of transmitting the channel estimation frame in two or more transmissions. The PHY modified transmission rate may be the average minus the standard deviation. Since there is a correlation between the MAC transmission rate and PHY transmission rate, the MAC transmission rate is available from the PHY transmission rate with predetermined formulas. The MAC modified transmission rate may be the MAC transmission rate multiplied by the error rate.

PLC modem 100 may calculate the transmission rate when not only transmitting the frame but also receiving the frame. The frame includes the channel estimation frame or a data frame. When PLC modem 100 calculates a two-way transmission rate, PLC modem 100 calculates the transmission rate not only with the frame sent to the other PLC modem but also with the frame received from the other PLC modem. The number of pairs of PLC modems calculating the two-way transmission rate is arbitrary.

Referring to FIG. 7, when the calculation process is finished, PLC modems 100T1, 100T2, Y, and 100T127 transmit calculation results to PLC modem 100M (step S103). A table shown in FIG. 9 is the result of the transmission rate calculated by PLC modem 100T1. Specifically, the table shows the destination MAC address (i.e., the MAC address of the destination side), connection status, and PHY transmission rate corresponding to the destination PLC number. The PHY transmission rate is averaged. A PHY transmission rate of "−1", indicates that the transmission rate is not calculated. Since destination PLC number A1" is PLC modem T1 itself, as shown in the connection status, the PHY transmission rate is "−1". Also, since destination PLC number A4" does not establish a link as shown in the connection status, the PHY transmission rate is "−1". The table does not need to have information of the connection status.

When PLC modem 100M receives the calculation results from PLC modem 100T1, 100T2, Y, and 100T127, PLC modem 100M generates status information based on both the received calculation results and the result of the calculation process performed by PLC modem 100M itself. The status information includes the connection status, transmission status, and identification information. "Transmission status" indicates the status of the power line. The status information includes, for example, the destination MAC address indicating the identification information, the connection status, and the PHY transmission rate indicating the transmission rate.

Referring to FIGS. 10, 11A, 11B, and 11C, reference table RT and the status tables ST0, ST1, ST2, provide some examples of the status information. Status table ST indicates a connection status between one of PLC modems 100 and the other PLC modems 100 through power line 900. The one PLC modem 100 works as a source modem. Status table ST may indicate only PLC modem 100 joining the PLC network. Reference table RT indicates the relation between status table ST and the PLC number.

Referring to FIG. 10, table number A0" of reference table RT indicates status table ST0 shown in FIG. 11A. Status table ST0 indicates the connection status between PLC modem 100M and the other PLC modems 100. As well as status table ST0, table number A1" of reference table RT indicates status table ST1 shown in FIG. 11B, and table number A2" of reference table RT indicates status table ST2 shown in FIG. 11C. When status tables ST0, ST1, ST2, need not be distinct, status table ST0, ST1, ST2 are referred to as "status table ST".

Referring to FIG. 11B, in a case in where the calculation results of the transmission rate are the results shown in FIG. 9, the results are available for status table ST1. If PLC modem too calculates a two-way transmission rate, each pair of PLC modems obtains two of the two-way transmission rates. In this case, the two, two-way transmission rates may be averaged as the transmission rate.

In step S103, each of PLC modems 100 calculates the two-way transmission rate with the other PLC modems. However, only one PLC modem out of each pair of PLC modems need calculate the two-way transmission rate, which makes the time for calculating the transmission rate short. Even in this case, since PLC modem 100M obtains all information included in FIG. 11A, 11B, and 11C, PLC modem 100M is capable of generating status tables ST1, ST2, ST3 shown in FIG. 11A, 11B, 11C. If only one PLC modem of each pair of PLC modems calculates only the one-way transmission rate, PLC modem 100 generates status table ST including the same transmission rate between a pair of PLC modems in each direction.

Referring to FIG. 12, status table ST200 provides another example. Status table ST200 consists of one table. Status table ST200 indicates the destination MAC address, connection status, and PHY transmission rate regarding all combinations of source and destination side PLC modems.

When PLC modem 100M finishes generating status information (step 8104), such as reference table RT and status table ST, PLC modem 100M stores the generated status information in memory 240. PLC modem 100M transmits the status information to PLC modems 100T1, 100T2, Y, and 100T127 (step S105). PLC modems 100T1, 100T2, Y, and 100T127 store the received status information in memory 240.

When users operate PLC modem 100M or electric appliances connecting to PLC modem 100M, PLC modem 100M displays the status information stored in memory 240 on display 105 of PLC modem 100M (and/or a display of the electric appliances) (step S106). PLC modem 100M displays the status information as shown in FIG. 7. However, PLC modems 100T1, 100T2, Y, and 100T127 may display the status information.

Next, processes of generating and storing status information by the master modem, will be described in detail with reference to FIG. 13. PLC modem 100M requests other PLC modems to perform the calculation process of the transmission rate. Controller 50 (CPU 211 in main IC 210) controls the processes of generating and storing status information, including the process of renewing status information.

Figure 13:
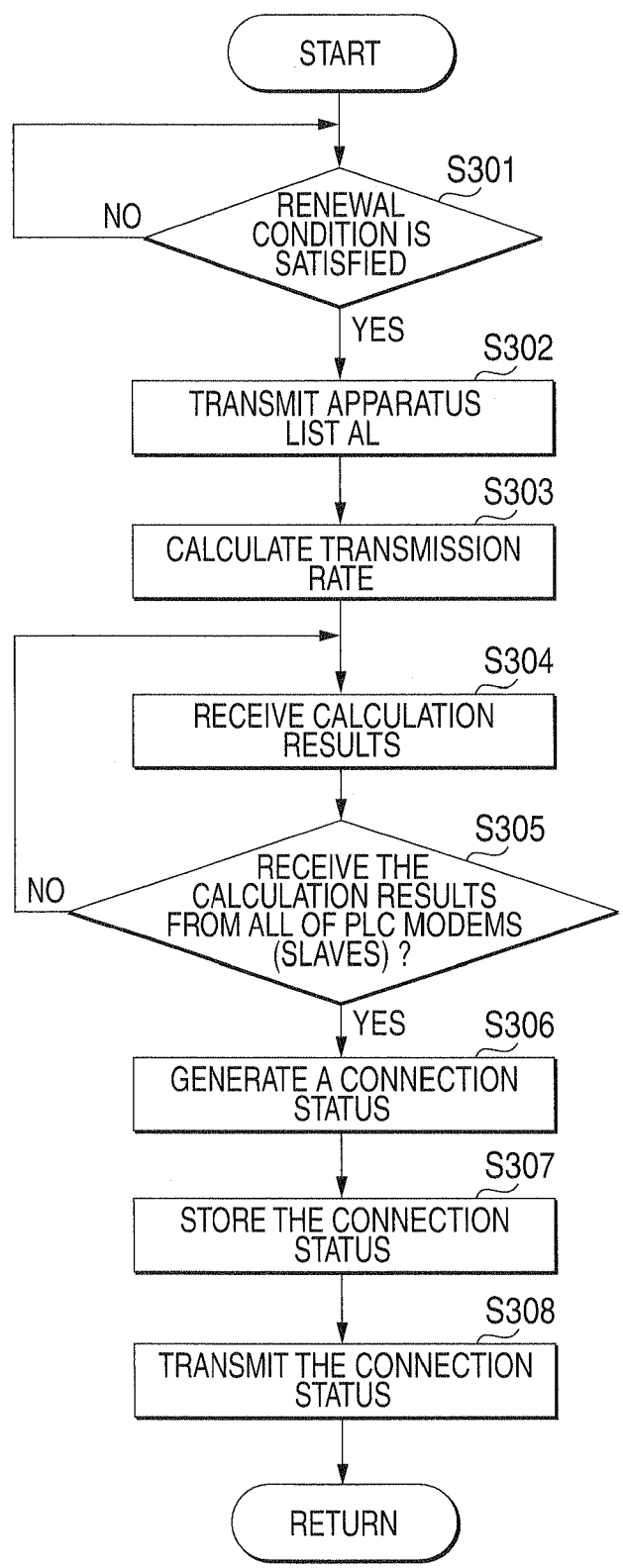
FIG. 13 is a flowchart illustrating processes of generating and storing the status information performed by the PLC modem (a master) according to the first embodiment.

Referring to FIG. 13, PLC modem 100M determines whether or not a renewal condition is satisfied (step S301). When PLC modem 100M determines that the renewal condition is satisfied, PLC modem 100M transmits to the other PLC modems 100T1, 100T2, 100T3, Y, and 100T127 an apparatus list AL stored in memory 240 (step S302 and step S101 in FIG. 7). The renewal condition includes a case where a connection status changes, a case where a predetermined time passes, and a case where electric appliances request a PLC modem to renew apparatus list AL. However, PLC modem 100M may request PLC modems 100T1, 100T2, Y, and 100T127 to calculate the transmission rate without transmitting apparatus list AL.

In step S303, PLC modem 100M itself calculates the transmission rate with PLC modem 100T1, the transmission rate with PLC modem 100T2,Y, and the transmission rate with PLC modem 100T127 (see also step S102 in FIG. 7). PLC modem 100M receives the calculation results of the transmission rate from the other PLC modems (step S304). PLC modem 100M determines whether or not it receives the calculation results from all of PLC modems 100T1, 100T2, Y, and 100T127 (step S305).

When PLC modem 100M receives all of the calculation results from all of PLC modems 100T1, 100T2, Y, and 100T127, PLC modem 100M generates status information (step S306 and step S104 in FIG. 7). PLC modem 100M stores the generated status information in memory 240 (step S307) and transmits the stored status information to PLC modems 100T1, 100T2, Y, and 100T127 (step S308 and step S105 in FIG. 7).

Next, processes by slave modems will be described in detail referring to FIG. 14. Each of PLC modems 100T1, 100T2, Y, and 100T127 determines whether or not it receives apparatus list AL from PLC modem 100M (step S401). Each of PLC modems 100T1, 100T2, Y, and 100T127 calculates the transmission rate with the other PLC modems based on apparatus list AL (step S402 and step S102 in FIG. 7). Each of PLC modems 100T1, 100T2, Y, and 100T127 transmits calculation results of the transmission rate to PLC modem 100M (step S403 and step S103 in FIG. 7). Each of PLC modems 100T1, 100T2, Y, and 100T127 determines whether or not it receives status information from PLC modem 100M (step S404). Thereafter, each of PLC modems 100T1, 100T2, Y, and 100T127 stores the received status information in memory 240 (step S405).

In PLC modem 100 shown in FIG. 4, mainly PLC PHY block 213 performs the above-mentioned calculation of the transmission rate. CPU 211 and PLC MAC block 212 control PLC PHY block 213. CPU 211 performs processes of both transmitting the calculation results of the transmission rate and storing status information. CPU 211 in PLC modem 100m performs processes of generating and transmitting status information.

In the present embodiment, the processes of generating and transmitting status information may be performed by a unicast, anycast, multicast, or broadcast routing scheme.

Figure 14:
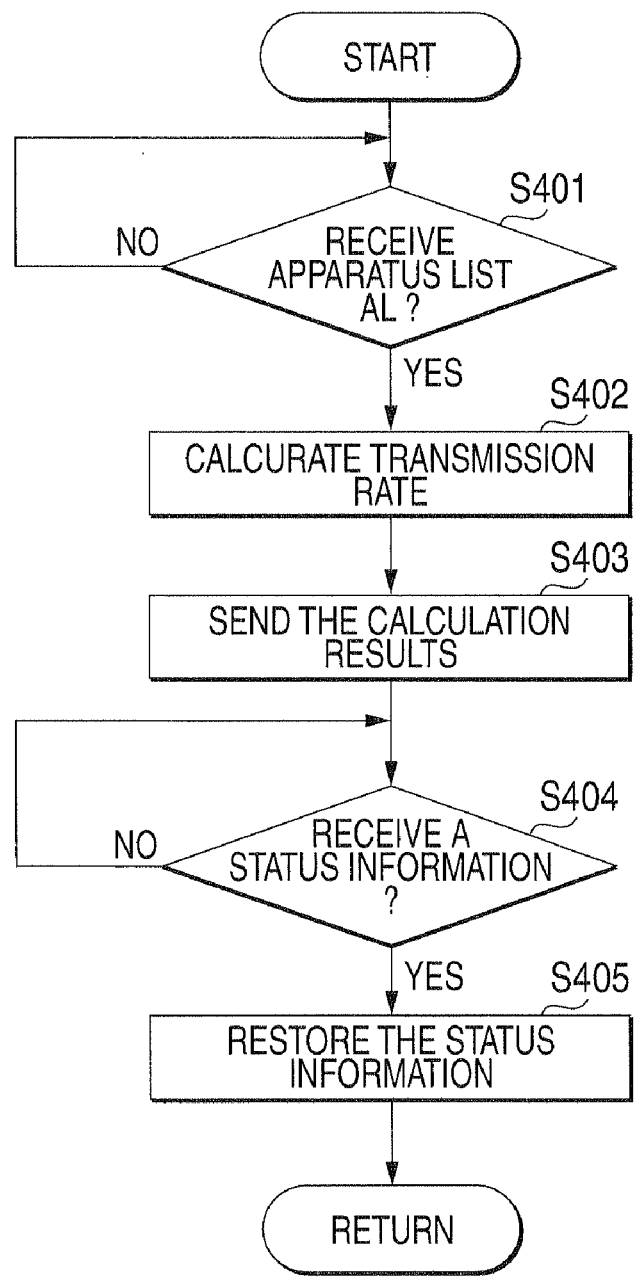
FIG. 14 is a flowchart illustrating processes of generating and storing the status information performed by one of a plurality of PLC modems (slaves) according to the first embodiment.

When the processes shown in FIGS. 13 and 14 are finished, both apparatus list AL and the status information stored in memory 240 in each of PLC modems 100T1, 100T2, Y, and 100T127 shows the latest status.

Next, processes of transmitting a signal as a packet will be described according to FIG. 7. FIG. 7 shows the case in which a source side, PLC modem 100T1 (PLC number: 1), transmits a signal to a destination side, PLC modem 100T3 (PLC number: 3).

When an event of a data transmitting process occurs (step S201), PLC modem 100T1 searches for an optimum path from the source side, PLC modem 100T1, to the destination side, PLC modem 100T3 (step S202). The optimum path is one whose transmission rate is the highest among a plurality of paths. The plurality of paths include both a direct path and one or more indirect paths. An indirect path is a path in which a source modem (PLC modem 100 of source side) and a destination modem (PLC modem too of destination side) perform communication through another PLC modem. A direct path is a path in which the source modem and the destination modem directly perform communication, without communicating through another PLC modem.

In the first embodiment, PLC modem 100T1 works as a source modem, and PLC modem 100T3 works as a destination modem. Accordingly, a PLC modem other than modems 100T1, 100T3 (e.g., PLC modems 100M, 100T2, 100T4, 100T5, Y, and 100T127) works as a relay modem. A relay modem has a function of forwarding a signal transmitted from a source modem to a destination modem. The relay modem is also referred to as a repeater.

The direct path and the indirect path will be described in detail in reference to FIG. 1B. Power line 900 combines neutral line P0, first voltage line P1, and second voltage line P2 inside the same outer jacket (not shown in drawing). If first and second voltage lines P1 and P2 and neutral line P0 need not to be distinguished, they may be referred to as lines P1, P2, P0, hereinafter. PLC modem 100T1 has power cables 611 and 612 that connect to neutral line P0 and first voltage line P1, respectively. PLC modem 100T2 has power cables 621 and 622 that connect to neutral line P0 and first voltage line P1, respectively. PLC modem 100T3 has power cables 631 and 632 that connect to neutral line P0 and second voltage line P2, respectively. Accordingly, power cable 611 connects to power cables 621 and 631 through neutral line P0. Power line 612 connects to power cable 622 through first voltage line P1, but does not connect to power cable 632 through first voltage line P1.

As described above, since power line 900 combines lines P1, P2, and P0 inside the outer jacket, gaps between lines P1, P2, P0 are relatively narrow. An inductance and capacitance are generated in the gaps. As shown in FIG. 1B, inductances 702, 703, 704, and 705 generate between first and second voltage lines P1 and P2. In this case, the direct path, from PLC modem 100T1 to PLC modem 100T3, is path PT1 shown with a solid line. In path PT1, power cable 611 leads to power cable 631 through neutral line P0. Power cable 612 leads to power cable 632 through inductances 702, 703, 704, and 705 generated between first and second voltage lines P1 and P2.

On the other hand, the indirect path, from PLC modem 100T1 to PLC modem 100T3 through PLC modem 100T2, is path PT2. Path 2 has path PT21 shown with a broken line and path PT22 shown with a chain line. In path PT2, power cable 611 leads to power cable 631 through neutral line P0. However, power cable 612 leads to power cable 632 through indicator 705 between first and second voltage lines P1, P2. Therefore, in this case shown in FIG. 1B, if a signal flows through the indirect path P2, the signal passes through fewer inductances than if the direct path were taken. If PLC modems 100M and 100T2 work as relay modems when PLC modem 100T1 transmits a signal to PLC modem 100T3, PLC modem 100T1 selects a path having higher transmission rate as an optimal path among a direct path, an indirect path corresponding to PLC modem 100M, and an indirect path corresponding to PLC modem 100T2.

Referring to FIG. 11B, the transmission rate of the direct path is 76 Mbps corresponding to PLC number "3". Referring to FIG. 11A, the transmission rate of the indirect path through PLC modem 100M is the lower value among 50 Mbps corresponding to PLC number A1' and 135 Mbps corresponding to PLC number "3". That is, the transmission rate is 50 Mbps. Referring to FIG. 11C, the transmission rate of the indirect path through PLC modem 100T2 is the lower value among 123 Mbps corresponding to PLC number A1" and 100 Mbps corresponding to PLC number "3". That is, the transmission rate is 100 Mbps. Therefore, since 100 Mbps is the highest among 76 Mbps, 50 Mbps, and 100 Mbps, PLC modem 100T1 selects the indirect path corresponding to PLC modem 100T2 as the optimum path. Then, PLC modem 100T1 generates transmission data (step S203).

Figure 15:
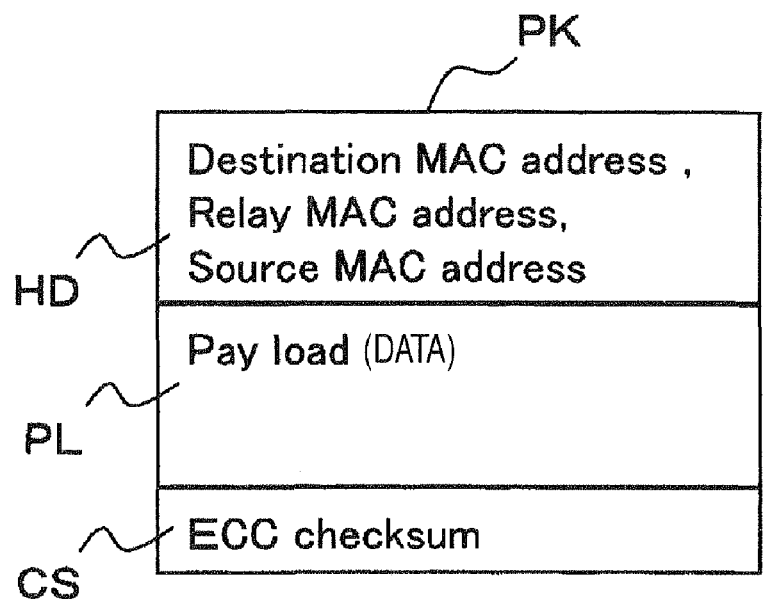
FIG. 15 illustrates a data format of a packet used by the power line communication system according to the first embodiment.
Figure 16:
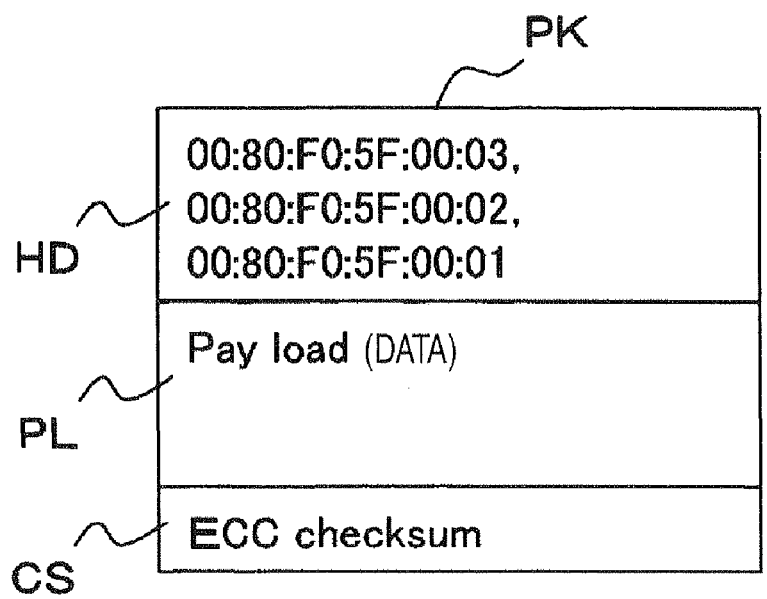
FIG. 16 is an example of a packet used by the power line communication system according to the first embodiment.

Referring to FIG. 15, a packet PK has a data format including areas such as a header HD, a payload PL, and a checksum CS. Header HD has a destination MAC address, a relay MAC address, and a source MAC address. The destination MAC address is a MAC address of a PLC destination modem. The source MAC address is a MAC address of a PLC source modem. Referring to FIG. 16, for example, the destination MAC address is "00:80:F0:5F:00:03", the relay MAC address is "00:80:F0:5F:00:02", and the source MAC address is "00:80:F0:5F:00:01".

In a case of communication through an indirect path, a source modem sets the relay MAC address of packet PK. When a relay modem forwards the packet to a destination modem, the relay modem changes the relay MAC address into a specific address, such as all zero (such as A00:00:00: 00:00:00") and a MAC address of the destination modem.

As described above in PLC modem 100 shown in FIG. 4, mainly CPU 210 performs processes of both calculating the transmission rate and searching the optimal path. And, mainly PLC controller 24 (PLC MAC block 212) performs the process of generating packet PK.

In step S204, since PLC modem 100T1 selected the indirect path corresponding to PLC modem 100T2, PLC modem 100T1 transmits packet PK to PLC modem 100T2. PLC modem 100T2 performs a relay process (step S205). In step 205, PLC modem 100T2 changes a relay MAC address of header HD. Specifically, PLC modem 100T2 changes the MAC address of the relay modem (i.e., A00:80:F0:5F:00:02") into the MAC address of the destination modem (i.e., A00:80: F0:SF:00:03"). After the relay process, PLC modem 100T2 forwards packet PK to PLC modem 100T3 (step S206). PLC modem 100T3 receives packet PK forwarded from PLC modem 100T2.

Then, in a case in which PLC modem 100T3 responds to packet PK, PLC modem 100T3 transmits the response signal to PLC modem 100T2 (step S207). PLC modem 100T2 performs the relay process for the response signal as in step S205 (step S208). PLC modem 100T2 forwards the response signal to PLC modem 100T1 (step S209).

Figure 17:
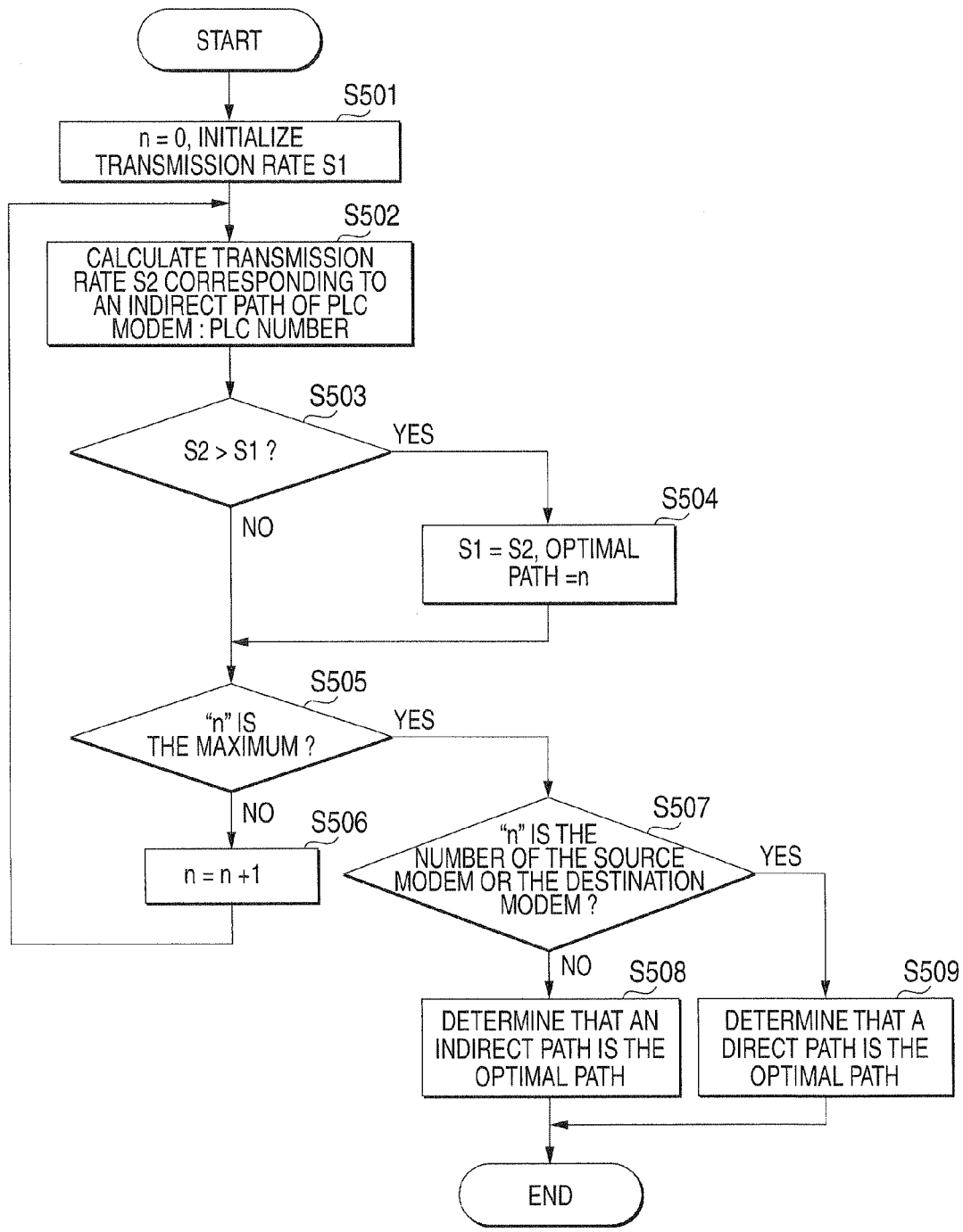
FIG. 17 is a flowchart illustrating processes of searching an optimal path performed by the PLC modem according to the first embodiment.

Referring to FIG. 17, an optimal path is selected among paths corresponding to all PLC modems including both a source modem and a destination modem. In a case in which the transmission rate corresponding to a source modem or a destination modem is the highest, such a path is selected.

In step S501, a source modem initializes parameters of a PLC number "n" and a transmission rate S1. The initial value of transmission rate S1 is a value corresponding to the direct path, along which a packet is transmitted without the relay process. In step S502, the source modem calculates transmission rate S2. Transmission rate S2 is a value corresponding to an indirect path of a relay modem (corresponding to PLC number "n") along which a packet is transmitted through the relay modem.

In a case in which the source modem is PLC modem 100T1 (PLC number: i) and a destination modem is PLC modem 100T3 (PLC number: 3), a transmission rate S2 at n=0 (i.e., the relay modem is PLC modem 100M) is 46 Mbps according to FIG. 11B. Specifically, the transmission rate, from PLC modem 100T1 to PLC modem M, is 46 Mbps as shown in PLC number A0" of FIG. 11B. A transmission rate, from PLC modem M to PLC modem 100 T3, is 135 Mbps as shown in PLC number A3" of FIG. 11A. Accordingly, the transmission rate with which a packet is transmitted through PLC modem 100M is 46 Mbps (i.e., the lower transmission rate out of 46 Mbps and 135 Mbps.

In step S503, the source modem compares transmission rate S2 with transmission rate S1. When transmission rate S2 is higher than transmission rate S1, transmission rate S2 indicates the highest value at this time. Accordingly, in step S504, the source modem sets transmission rate S2 as the highest transmission rate encountered. More specifically, the previously-highest transmission rate S1 is reset to take the value of S2 and PLC number "n", whose transmission rate is S2, is set as the optimal path determined so far. When the source modem determines that S2 is equal to or lower than transmission rate S1, the source modem determines whether or not PLC number "n" is the maximum modem number (step S505). The maximum is the highest number among all of the PLC numbers. In a case in which the number of slave modems is 127, the maximum is 127.

In step S505, when the source modem determines that PLC number "n" is not the maximum, the source modem increases the PLC number "n", by one and repeats operations S502 through S506 to determine the highest transmission rate and path corresponding thereto among all prospective relay modems.

On the other hand, in step S505, when the source modem determines that PLC number "n" is the maximum, the source modem ends the processes of calculating and comparing the transmission rates. Since transmission rate S1 indicates the highest transmission rate and PLC number "n" indicates the number regarding an optimal path, the source modem sets transmission data. In step S507, the source modem determines whether or not PLC number "n" is the number of the source modem or the destination modem. If the source modem determines PLC number "n" is PLC number of the source modem or the destination modem (that is, determines the transmission rate corresponding to a direct path is the highest), the source modem determines that a direct path is the optimal path (step S509). Then, the source modem ends the process of searching the optimal path. In this present embodiment, only one relay modem has been described though a plurality of relay modems may perform the relay process.

On the other hand, if the source modem determines PLC number "n" is not PLC number of the source modem or the destination modem, the source modem determines that an indirect path corresponding to a relay modem of PLC number "n" is the optimal path. Then, the source modem ends the process of searching the optimal path (step S508).

In PLC modem 100 shown in FIGS. 4 and 5, controller 50 (CPU 211) performs the process of searching the optimal path. PLC controller 24 utilizes the results of the searching process. Controller 50 (CPU 211) generates packet PK shown in FIG. 16.

Figure 18:
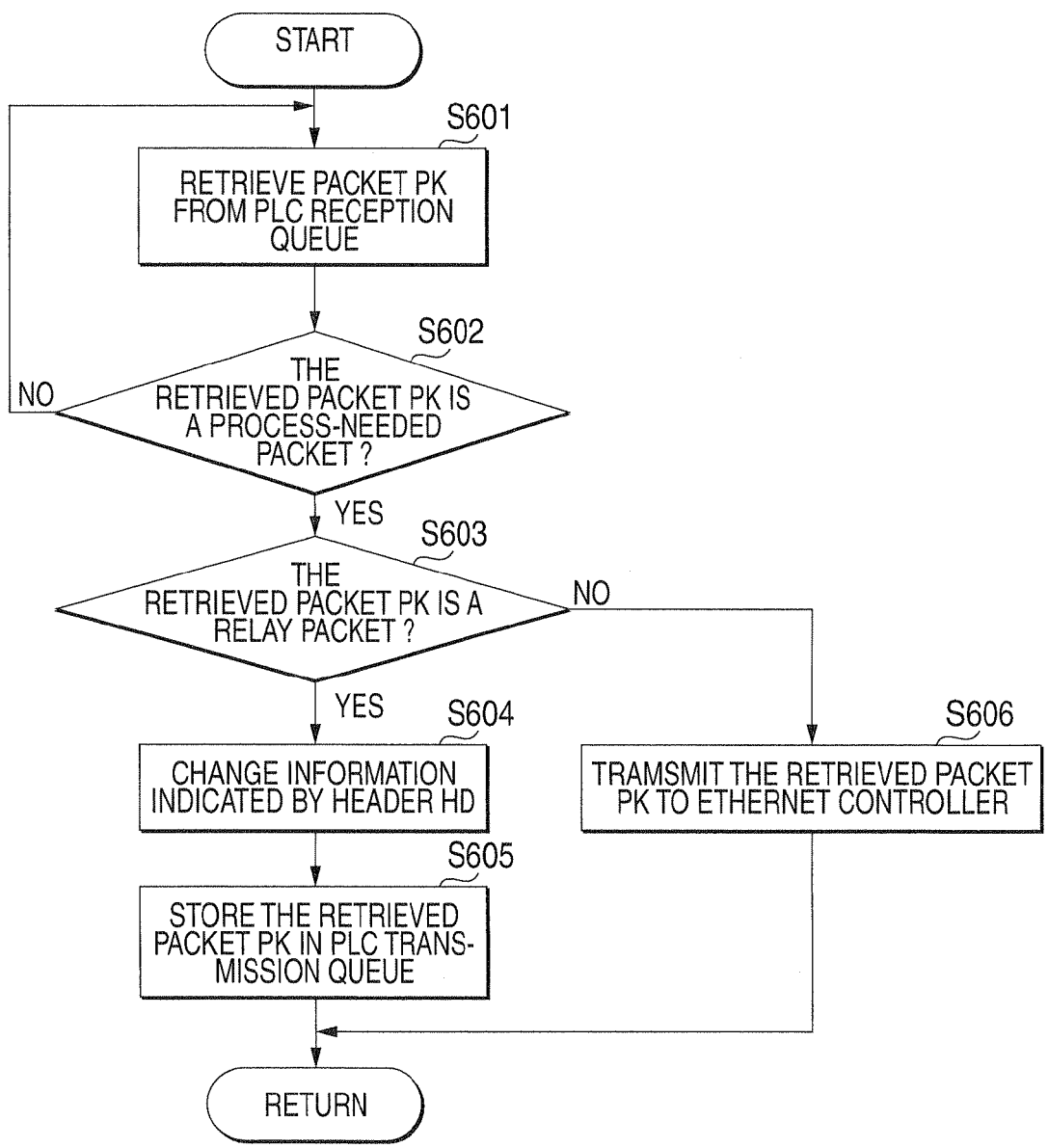
FIG. 18 is a flowchart illustrating receiving and forwarding processes performed by the PLC modem according to the first embodiment.

Examples of the reception process and the relay process are described in detail according to FIGS. 5 and 18. PLC controller 24 in PLC modem 100 performs these processes. In step S601 PLC controller 24 retrieves packet PK from PLC reception queue 22b. In step S602, PLC controller 24 determines whether or not packet PK is a process-needed packet.

A process-needed packet is a packet PK that a PLC modem forwards to another PLC modem (i.e., in a case of a relay modem) or a packet from which a PLC modem reads out data (i.e., in a case of a destination modem). PLC controller 24, according to the destination MAC address and relay MAC address in header HD, determines whether or not packet PK is a process-needed packet.

In a case in which PLC controller 24 determines by a relay MAC address indicating all zeroes or its own MAC address, the process-needed packets are as follows: a packet PK having a relay MAC address indicating PLC controller's own MAC address and a packet PK having both a relay MAC address indicating all zeroes and a destination MAC address indicating the PLC controller's own MAC address.

In a case in which PLC controller 24 determines by a relay MAC address that is the same as its destination MAC address, the process-needed packet is a packet PK having a relay MAC address indicating the controller's own MAC address. If the retrieved packet PK is not a process-needed packet, PLC controller 24 discards the retrieved packet.

If PLC controller 24 determines that the retrieved packet PK is a process-needed packet, PLC controller 24 determines whether or not the retrieved packet PK is a relay packet (step S603). A relay packet is a packet that PLC modem 100 forwards to another PLC modem. If PLC controller 24 determines that the retrieved packet PK is not a relay packet (i.e., the retrieved packet PK is a packet sent to this PLC modem as the destination modem), PLC controller 24 transmits the retrieved packet PK to ethernet controller 23 (step S606) and ends this process.

On the other hand, in step S604, PLC controller 24 changes information indicated by header HD in the retrieved packet PK in such a manner that the relay MAC address indicates all zeroes or the same address as the PLC controller's destination MAC address. In step S605, PLC controller 24 stores the retrieved packet PK in PLC transmission queue 22*a*, and ends this process.

Figure 19:
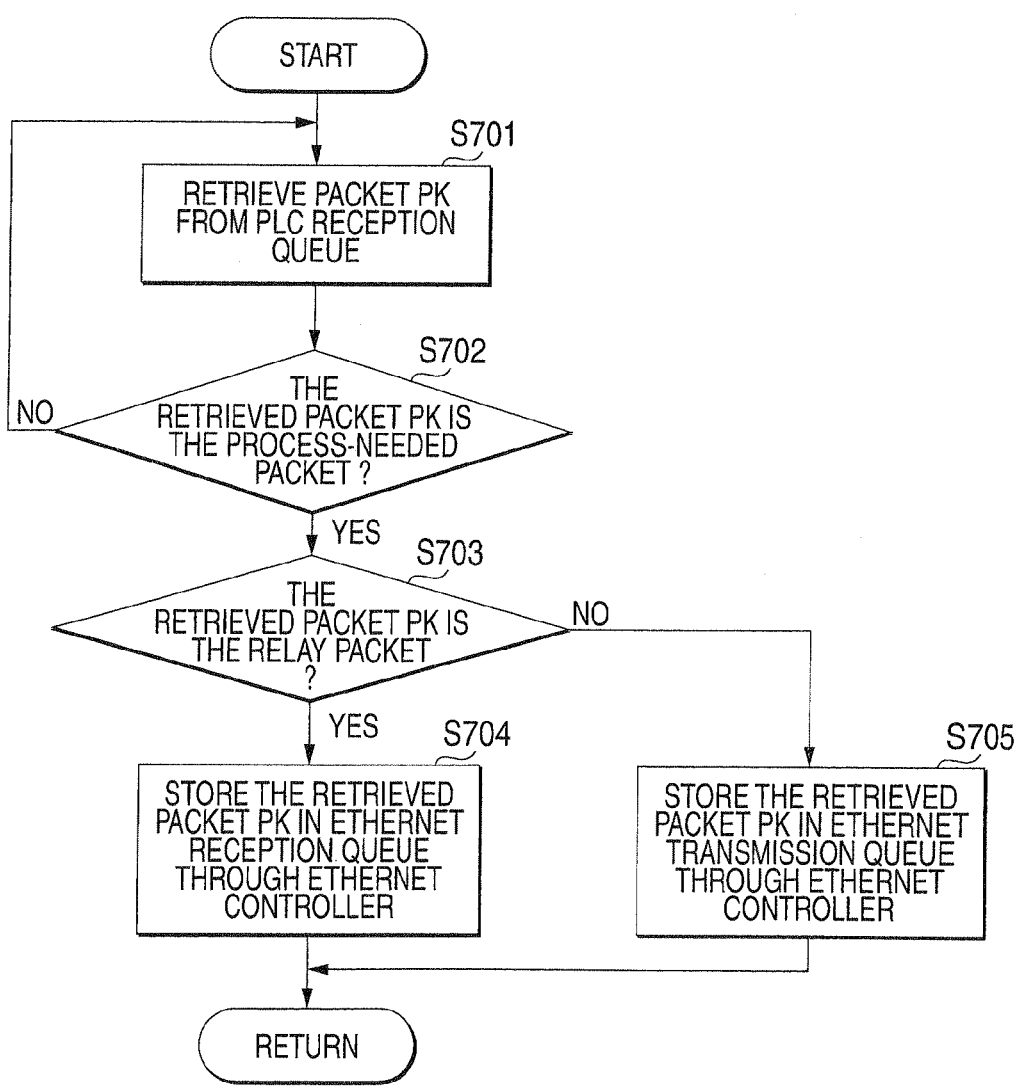
FIG. 19 is another example of the flowchart illustrating receiving and forwarding processes performed by the PLC modem according to the first embodiment.

Referring to FIG. 18, only PLC controller 24 performs the relay process. However, referring to FIG. 19, PLC controller 24 and ethernet controller 23 perform the relay process.

In step S701, PLC controller 24 retrieves packet PK from PLC reception queue 22*b*. In step S702, PLC controller 24 determines whether or not the retrieved packet PK is a process-needed packet. This process of determining whether or not the retrieved packet PK is a process-needed packet is the same as for the example described in FIG. 18.

If PLC controller 24 determines that the retrieved packet PK is a process-needed packet, PLC controller 24 determines whether or not the retrieved packet PK is a relay packet (step S703). If PLC controller 24 determines that the retrieved packet PK is not a relay packet (i.e., the retrieved packet PK is a packet sent to this PLC modem as the destination modem), PLC controller 24 stores the retrieved packet PK in ethernet transmission queue 21*a* through ethernet controller 23 (step S705) and ends this process.

On the other hand, if PLC controller 24 determines that the retrieved packet PK is a relay packet, in step S704, PLC controller 24 stores the retrieved packet PK in ethernet reception queue 21*b* through ethernet controller 23 (step S705) and ends this process. In this case, PLC controller 24 adds to the retrieved packet PK information indicating the completion of the relay process. Then, ethernet controller 23 transmits to PLC controller 24 the retrieved packet PK stored in ethernet reception queue 21*b*. PLC controller 24 changes information of header HD in the retrieved packet PK into information indicating communication using the direct path. PLC controller 24 stores the retrieved packet PK in PLC transmission queue 22*a*.

Thus, since PLC modem 100 performs the above-mentioned processes, PLC modem 100 is capable of transmitting or receiving data through the optimal path. As a result, PLC system 800 is capable of performing efficiently the power line communication regardless of the connection status to power line 900.

Second Embodiment

The first embodiment describes a case where, PLC modem 100M (that is, the master modem) performs the processes of transmitting apparatus list AL, receiving the calculation results of the transmission rate, generating the status information, and transmitting the generated status information. However, instead of the master modem, one of the slave modems may perform these processes as a representative PLC modem. In this case, the slave mode retrieves apparatus list AL from the master modem.

Figure 20:
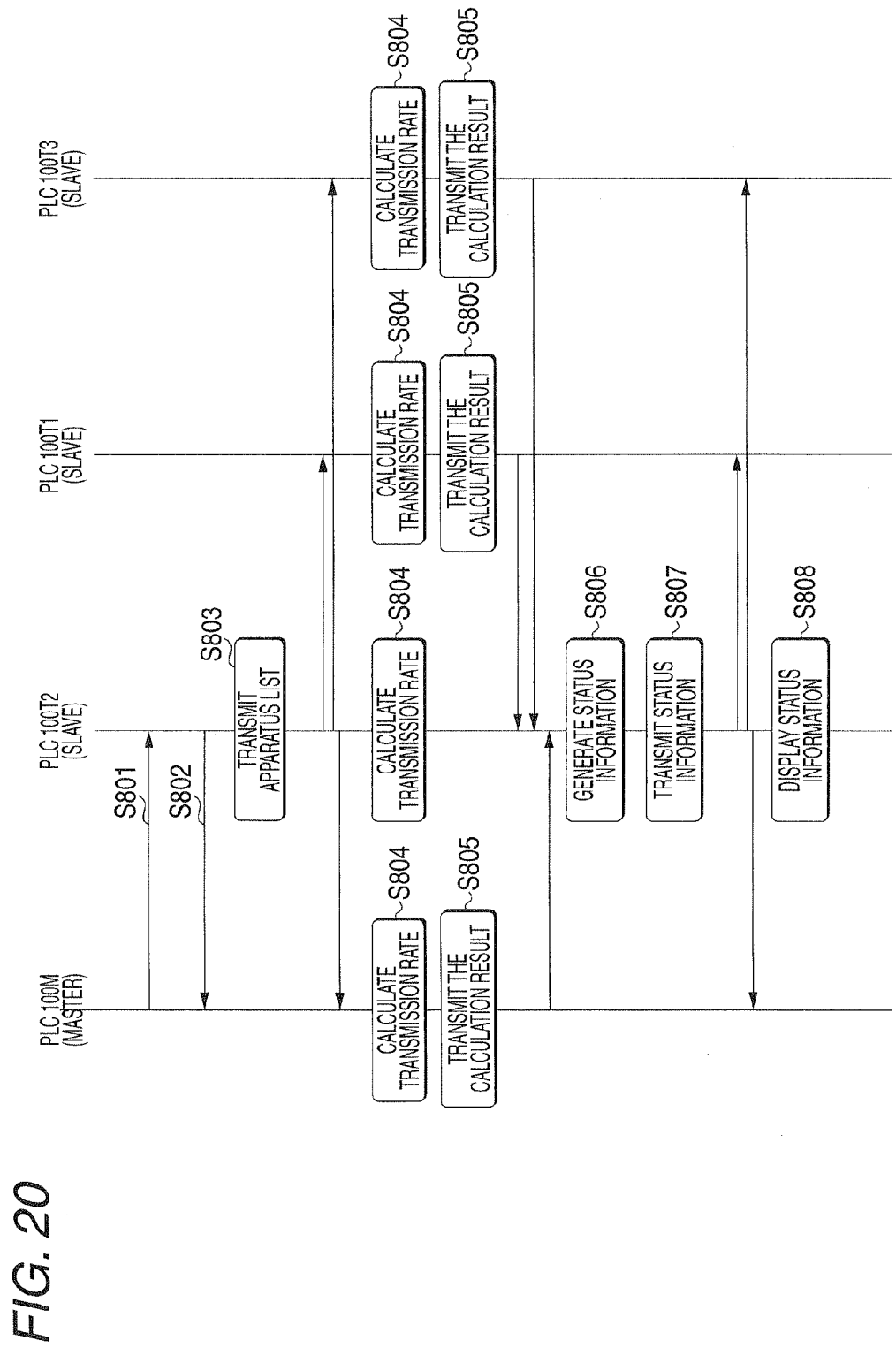
FIG. 20 illustrates a sequence of process performed by a power line communication system according to the second embodiment.
Figures 21A, 21B:
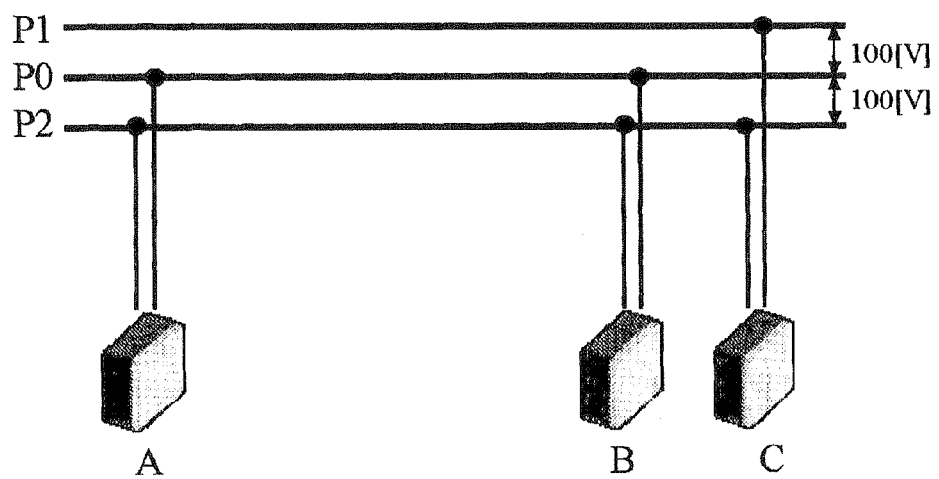
FIG. 21A illustrates a configuration of a power line communication system according to the related art.
FIG. 21B illustrates attenuation and throughput corresponding to a path according to the related art.

Referring to FIG. 20, the second embodiment is described regarding different processes from the first embodiment, that is, except the processes of transmitting apparatus list AL, receiving the calculation results of transmission rate, generating the status information, and transmitting the status information.

Referring to FIG. 20, PLC modem 100T2 is the representative PLC modem. PLC modem 100T2 transmits to PLC modem 100M a request for transmitting apparatus list AL at the predetermined timing, such as a timing when status information is renewed (step S801). PLC modem 100M transmits stored apparatus list AL to PLC modem 100T2 (step S802).

PLC modem 100T2 transmits apparatus list AL to other PLC modems 100T1 and 100T3 (step S 803). All of PLC modems 100M, 100T1, 100T2, and 100T3 calculate transmission rates (step S804). PLC modems 100M, 100T1, and 100T3 transmit the calculation results of the transmission rate to PLC modem 100T2 (step S805). When PLC modem 100T2 receives the calculation results, PLC modem 100T2 generates status information based on both the received calculation results and the results calculated by PLC modem 100T2 itself (step S806). Then, PLC modem 100T2 transmits the generated status information to other PLC modems 100M, 100T1, and 100T3 (step S807). Thereafter, PLC modem 100T2 displays the status information (step S808).

Since processes after step 803 are basically the same as the processes after step S101 shown in FIG. 7, a description of these processes is omitted here.

In the first and second embodiments, processes of transmitting apparatus list AL and status information are performed by unicast; however, these processes may be performed by anycast, multicast, or broadcast.

In the first and second embodiments, a power line communication apparatus uses the power line as a transmission line and performs wideband communication (e.g., 1.705-80 MHz or 2 to 30 MHZ) in the multicarrier communication system. For the communication apparatus of the present embodiment, however, the power line communication apparatus is not limited to the multicarrier communication system, but may be a single carrier communication system or a spread spectrum system. Further, the transmission line is not limited to the power line, and may be a transmission line used for other ordinary communication, as far as power line communication via an electrical outlet is applied for an external communication device. For example, transmission lines, such as a coaxial cable, a telephone line, a speaker line, or a harness, may be used.

The foregoing description illustrates and describes the present invention. However, the disclosure shows and describes only the preferred embodiments of the invention, but it is to be understood that the invention is capable of use in various other combinations, modifications, and environments. Also, the invention is capable of change or modification, within the scope of the inventive concept, as expressed herein, that is commensurate with the above teachings and the skill or knowledge of one skilled in the relevant art. For example, one or more elements of each embodiment may be omitted or incorporated into the other embodiments.

The foregoing description of implementations and embodiments of the invention have been presented for purposes of non-limiting illustration and description. Although the present invention has been described herein with reference to particular structures, materials and embodiments, the present invention is not intended to be limited to the particular features and details disclosed herein. Rather, the present invention extends to all functionally equivalent structures, methods and uses, such as are within the scope of the appended claims. The descriptions provided herein are not exhaustive and do not limit the invention to the precise forms disclosed. The foregoing embodiment examples have been provided merely for purposes of explanation and are in no way to be construed as limiting the scope of the present invention. The words that have been used herein are words of description and illustration, rather than words of limitation. The present teachings can readily be realized and applied to other types of apparatuses. Further, modifications and variations, within the purview, scope and sprit of the appended claims and their equivalents, as presently stated and as amended hereafter, are possible in light of the above teachings or may be acquired from practicing the invention. Furthermore, although elements of the invention may be described or claimed in the singular, the plural is contemplated unless limitation to the singular is explicitly stated Alternative structures discussed for the purpose of highlighting the invention's advantages do not constitute prior art unless expressly so identified. No one or more features of the present invention are necessary or critical unless otherwise specified.

This application is based on the Japanese Patent Application No. 2006-250965 filed on Sep. 15, 2006, the entire contents of which are expressly incorporated by reference herein.

What is claimed is:

1. A power line communication apparatus for transmitting a signal to a first power line communication apparatus through a power line connecting to a second power line communication apparatus, the power line communication apparatus comprising:
   an information retriever that retrieves transmission rate information indicating both a first transmission rate and a second transmission rate, the first transmission rate corresponding to a first path of the power line along which the signal is directly transmitted to the first power line communication apparatus, and the second transmission rate corresponding to a second path of the power line along which the signal is transmitted through the second power line communication apparatus to the first power line communication apparatus;
   a selector that selects, based on the transmission rate information retrieved by the information retriever, a path corresponding to a higher transmission rate among the first path and the second path; and
   a transmitter that transmits the signal, through the path selected by the selector, to the first power line communication apparatus, wherein:
   the information retriever further retrieves status information indicating whether or not at least one of the first power line communication apparatus and the second power line communication apparatus joins a power line communication network, and
   the selector selects the path based on both the transmission rate information and the status information retrieved by the information retriever.

2. The power line communication apparatus according to claim 1, further comprising:
   a memory that stores the status information retrieved by the information retriever; and
   a renewing unit that renews the status information stored in the memory if the information retriever retrieves other status information, wherein
   the selector selects the path based on the status information renewed by the renewing unit.

3. The power line communication apparatus according to claim 2, wherein the renewing unit renews, every predetermined period, the status information stored in the memory.

4. The power line communication apparatus according to claim 1, further comprising a display that displays the status information retrieved by the information retriever.

5. The power line communication apparatus according to claim 1, wherein the information retriever retrieves the status information from at least one of the first power line communication apparatus and the second power line communication apparatus.

6. The power line communication apparatus according to claim 1, further comprising:
   a memory that stores the transmission rate information retrieved by the information retriever; and
   a renewing unit that renews the transmission rate information stored in the memory if the information retriever retrieves other transmission rate information, wherein
   the selector selects the path based on the transmission rate information renewed by the renewing unit.

7. The power line communication apparatus according to claim 6, wherein the renewing unit renews, every predetermined period, the transmission rate information stored in the memory.

8. The power line communication apparatus according to claim 1 further comprising:
   a calculator that calculates both the first transmission rate and the second transmission rate, wherein:
   the information retriever retrieves, from the calculator, the transmission rate information indicating both the first transmission rate and the second transmission rate.

9. The power line communication apparatus according to claim 1, wherein the information retriever retrieves the transmission information from at least one of the first power line communication apparatus and the second power line communication apparatus.

10. The power line communication apparatus according to claim 1, wherein:
    the information retriever further retrieves an address of the first power line communication apparatus, and
    the transmitter transmits the signal based on the address retrieved by the information retriever.

11. A power line communication system performing power line communication through a power line, the power line communication system comprising:
    a first power line communication apparatus;
    a second power line communication apparatus; and
    a third power line communication apparatus that transmits a signal to the first power line communication apparatus through the power line that connects to the second power line communication apparatus, wherein:
    the third power line communication apparatus comprises:
       an information retriever that retrieves transmission rate information indicating both a first transmission rate and a second transmission rate, the first transmission rate corresponding to a first path of the power line along which the signal is directly transmitted to the first power line communication apparatus, and the second transmission rate corresponding to a second path of the power line along which the signal is transmitted through the second power line communication apparatus to the first power line communication apparatus;

a selector that selects, based on the transmission rate information retrieved by the information retriever, a path corresponding to a higher transmission rate among the first path and the second path; and a transmitter that transmits the signal, through the path selected by the selector, to the first power line communication apparatus, wherein:

the information retriever further retrieves status information indicating whether or not at least one of the first power line communication apparatus and the second power line communication apparatus joins a power line communication network and the selector selects the path based on both the transmission rate information and the status information retrieved by the information retriever.

12. A power line communication method for transmitting a signal to a first power line communication apparatus through a power line connecting to a second power line communication apparatus, the power line communication method comprising:

retrieving transmission rate information indicating both a first transmission rate and a second transmission rate, the first transmission rate corresponding to a first path of the power line along which the signal is directly transmitted to the first power line communication apparatus, and the second transmission rate corresponding to a second path of the power line along which the signal is transmitted through the second power line communication apparatus to the first power line communication apparatus;

selecting, based on the retrieved transmission rate information, a path corresponding to a higher transmission rate among the first path and the second path; and transmitting the signal, through the selected path, to the first power line communication apparatus, wherein the method further comprises:

retrieving status information indicating whether or not at least one of the first power line communication apparatus and the second power line communication apparatus joins a power line communication network, and the selecting of the path further comprises selecting the path based on both the transmission rate information and the retrieved status information.

13. An integrated circuit for performing power line communication of a signal to a first power line communication apparatus through a power line connecting to a second power line communication apparatus, the integrated circuit comprising:

an information retriever that retrieves transmission rate information indicating both a first transmission rate and a second transmission rate, the first transmission rate corresponding to a first path of the power line along which the signal is directly transmitted to the first power line communication apparatus, and the second transmission rate corresponding to a second path of the power line along which the signal is transmitted through the second power line communication apparatus to the first power line communication apparatus; and a selector that selects, based on the transmission rate information retrieved by the information retriever, a path corresponding to a higher transmission rate among the first path and the second path, wherein:

the information retriever further retrieves status information indicating whether or not at least one of the first power line communication apparatus and the second power line communication apparatus joins a power line communication network, and the selector selects the path based on both the transmission rate information and the status information retrieved by the information retriever.

14. A power line communication apparatus for transmitting a signal to another power line communication apparatus through a power line connecting to a plurality of relay power line communication apparatuses, the power line communication apparatus comprising:

an information retriever that retrieves transmission rate information indicating both a first transmission rate and a second transmission rate, the first transmission rate corresponding to a first path of the power line along which the signal is directly transmitted to the other power line communication apparatus, and the second transmission rate corresponding to a second path of the power line along which the signal is transmitted through at least one relay power line communication apparatus from among the plurality of relay power line communication apparatuses to the other power line communication apparatus;

a selector that selects, based on the transmission rate information retrieved by the information retriever, a path corresponding to a higher transmission rate among the first path and the second path; and a transmitter that transmits the signal, through the path selected by the selector, to the other power line communication apparatus, wherein:

the information retriever further retrieves status information indicating whether or not at least one of the other power line communication apparatus and the plurality of relay power line communication apparatuses joins a power line communication network, and the selector selects the path based on both the transmission rate information and the status information retrieved by the information retriever.

* * * * *